(12) United States Patent
Batraski et al.

(10) Patent No.: US 10,474,728 B2
(45) Date of Patent: Nov. 12, 2019

(54) SEAMLESS BROWSING BETWEEN DEVICES

(75) Inventors: Ethan Batraski, Foster City, CA (US); Shenhong Zhu, Santa Clara, CA (US)

(73) Assignee: Oath Inc., New York, NY (US)

( * ) Notice: Subject to any disclaimer, the term of this patent is extended or adjusted under 35 U.S.C. 154(b) by 9 days.

(21) Appl. No.: 13/425,558

(22) Filed: Mar. 21, 2012

(65) Prior Publication Data

US 2013/0254685 A1  Sep. 26, 2013

(51) Int. Cl.
*G06F 16/955* (2019.01)
*H04L 29/08* (2006.01)

(52) U.S. Cl.
CPC ........ *G06F 16/955* (2019.01); *H04L 67/1095* (2013.01)

(58) Field of Classification Search
CPC ...... G06F 15/16; G06F 3/01; G06F 17/30876; G06F 17/3089; G11C 19/00; H04L 67/1095
USPC .......................................................... 715/760
See application file for complete search history.

(56) References Cited

U.S. PATENT DOCUMENTS

| | | | |
|---|---|---|---|
| 6,865,599 B2 | 3/2005 | Zhang | |
| 7,584,249 B2 | 9/2009 | Mumick et al. | |
| 7,886,004 B2* | 2/2011 | Mumick et al. | 709/205 |
| 8,225,191 B1* | 7/2012 | Kalman | 715/203 |
| 2005/0066037 A1 | 3/2005 | Song et al. | |
| 2007/0054627 A1* | 3/2007 | Wormald | 455/70 |
| 2007/0124693 A1* | 5/2007 | Dominowska | G06F 17/30867 715/772 |
| 2007/0130167 A1* | 6/2007 | Day et al. | 707/10 |
| 2007/0157304 A1* | 7/2007 | Logan et al. | 726/12 |
| 2007/0271317 A1* | 11/2007 | Carmel | 707/204 |
| 2008/0016225 A1* | 1/2008 | Malik | H04L 67/14 709/227 |
| 2008/0160974 A1 | 7/2008 | Vartiainen et al. | |

(Continued)

FOREIGN PATENT DOCUMENTS

| | | |
|---|---|---|
| CA | 2557030 A1 | 2/2007 |
| CN | 1945535 A | 4/2007 |
| CN | 101924779 A | 12/2010 |

OTHER PUBLICATIONS

International Search Report dated May 30, 2013 corresponding to PCT/US2013/025660.

(Continued)

*Primary Examiner* — Jennifer N To
*Assistant Examiner* — Amy P Hoang
(74) *Attorney, Agent, or Firm* — Pillsbury Winthrop Shaw Pittman LLP

(57) ABSTRACT

System and method for seamless browsing is disclosed, the system comprising a first device, a second device, and a storage unit. The first device comprises a first browser for interfacing a user with information on a network and the second device comprising a second browser for interfacing the user with information on the network. The storage unit connected to the network for storing a state of the first and the second browsers. The first and the second browser each comprising a synchronization unit that stores the current state of the corresponding browser in the storage unit and copies a state of another browser stored on the storage unit into the corresponding browser of the synchronization unit upon a request.

17 Claims, 18 Drawing Sheets

(56) References Cited

U.S. PATENT DOCUMENTS

| | | | |
|---|---|---|---|
| 2008/0289029 A1* | 11/2008 | Kim | G06F 17/30905 726/12 |
| 2009/0204966 A1* | 8/2009 | Johnson | G06F 9/4856 718/100 |
| 2009/0293018 A1* | 11/2009 | Wilson et al. | 715/811 |
| 2010/0057785 A1 | 3/2010 | Khosravy et al. | |
| 2010/0306773 A1 | 12/2010 | Lee | |
| 2011/0055627 A1* | 3/2011 | Zawacki | H04L 67/14 714/15 |
| 2011/0219105 A1* | 9/2011 | Kryze | G06F 15/16 709/223 |
| 2011/0295824 A1* | 12/2011 | Schneider | G06F 17/30427 707/706 |
| 2012/0054385 A1* | 3/2012 | Lim et al. | 710/63 |
| 2012/0078756 A1* | 3/2012 | Tsugihashi | G06F 9/44505 705/27.1 |
| 2012/0096069 A1* | 4/2012 | Chan | G06F 9/4856 709/203 |
| 2012/0297367 A1* | 11/2012 | Mujeeb | G06F 11/3688 717/125 |
| 2013/0041790 A1* | 2/2013 | Murugesan et al. | 705/30 |
| 2013/0187953 A1* | 7/2013 | Matsumura | G06K 9/6201 345/633 |

OTHER PUBLICATIONS

Office Action dated Jun. 23, 2015 in Taiwanese Application No. 102107215.
Extended European Search Report dated Sep. 4, 2015 in EP Application 13765258.2.
Chris Hoffman, "How to Sync Your Browser Data with Firefox Sync", How-To Geek, Feb. 17, 2012.
"SugarSync User Guide Version 2.0", Dec. 18, 2011.
Office Action dated Apr. 29, 2016 in Chinese Application No. 201380014003.4.
Notice of Allowance dated Feb. 24, 2018 in Chinese Application 201380014003.4.
Office Action dated Feb. 22, 2018 in European Application 13765-258.2.

* cited by examiner

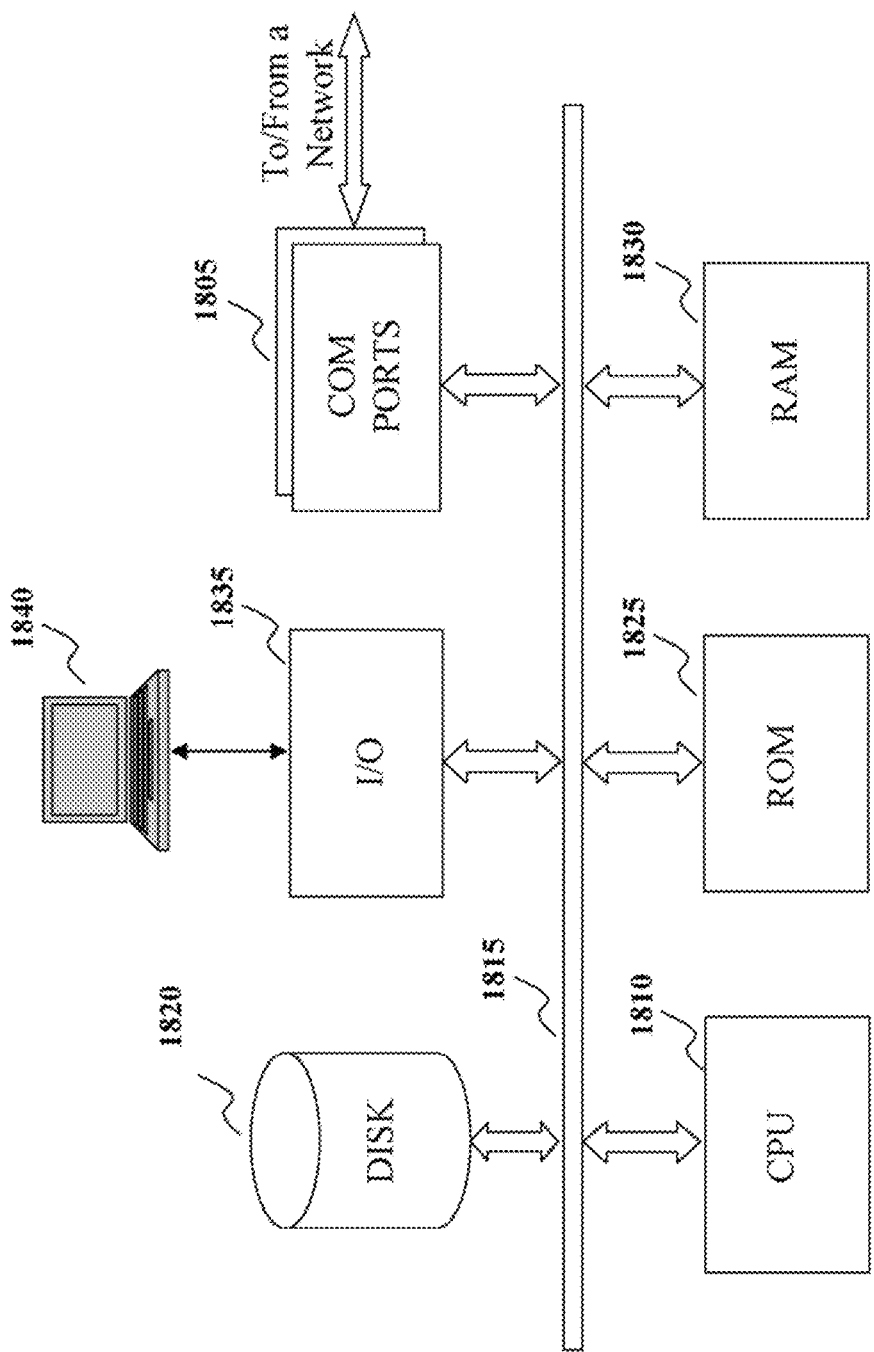

SEAMLESS BROWSING BETWEEN DEVICES

BACKGROUND

1. Technical Field

The present teaching relates to methods, systems, and programming for seamless browsing.

Particularly, the present teaching is directed to methods, systems, and programming for enabling seamless continuation of a browser session and access to search and browser history between the devices of a user.

2. Discussion of Technical Background

Users are increasingly using multiple devices to search and browse the internet. Users, however, suffer from a lack of connectedness between devices so that browsing by a user on a device is independent of the browsing of the user on any other device. A users session on one device is isolated and fragmented from browsing sessions on other devices. The user has to re-start completely a browsing session when moving to another device, with no access to history or state. The above is frustrating for the user. Further, each time the user switches device, the user may change service provider purely because of the interruption. For a service provider integrated browsing between devices would allow both the user and the service provider to maintain a continuous browsing session, enhancing the user's experience, and allowing the service provider to keep the user from moving to another service provider. For the service provider, continuous browsing across devices also allows more consistent data about the user to be collected across all of the devices of the user. The service provider is able to track continuous browsing rather than seeing fragments of browsing sessions on different devices. This allows the service provider to provide a better service to the user, and so attract more users. The service provider is also able to provide better-targeted advertising to the user and therefore is able to enhance revenues and profits.

SUMMARY

The teachings disclosed herein relate to methods, systems, and programming for seamless browsing. More particularly, the present teaching relates to methods, systems, and programming for enabling seamless continuation of a browser session and access to search and browser history between the devices of a user.

Enabling a connected device experience in the context of browsing and searching allows users to seamlessly connect browsing sessions on their devices and effortlessly continue a task regardless of the device instead of being isolated to an individual device.

In one example, a system for seamless browsing is disclosed, the system comprising a first device, a second device, and a storage unit. The first device comprising a first browser for interfacing a user with information on a network. The second device comprising a second browser for interfacing the user with information on the network. The storage unit connected to the network for storing a state of the first and the second browsers. The first and the second browser each comprising a synchronization unit that stores the current state of the corresponding browser in the storage unit and copies a state of another browser stored on the storage unit into the corresponding browser of the synchronization unit upon a request.

In another example, a system for seamless browsing on a network is disclosed. The system comprises a device comprising a browser for interfacing with a user on information. The browser comprises a synchronization unit that is configured to store a current state of the browser and copy a state of another browser stored on a storage unit on the network into the browser of upon a request so that the states of the browser and the other browser can be synchronized.

In yet another example, a system for seamless browsing on a network comprising is disclosed. The system comprises a storage unit connected to the network for storing a state of a first and a second browser on different devices of a user. The storage unit adapted to receive and store a current state of the first and the second browsers, and send a stored state of the first or second browser to the other of the browsers upon a request so that the states of the first and second browsers can be synchronized.

In another example, a method implemented on a machine having at least one processor, storage, and a communication platform connected to a network for seamless browsing is disclosed. A browser state is received, by a server, from a first browser running on a first device. The received browser state is stored by the server. A request for the stored browser state of the first browser is received, by the server, from a second browser running on a second device. The stored browser state associated with the first browser is retrieved by the server. The retrieved browser state of the first browser is sent, by the server, to the second browser.

In another yet example, a method implemented on a machine having at least one processor, storage, and a communication platform connected to a network, is disclosed. A browser is initiated running on a device. A request from a user is received. A first current state of the browser is generated. The first current state of the browser is sent to a server. One or more pieces of content are identified based on the request. At least one of the one or more pieces of content is displayed to the user.

In another yet example, a method implemented on a machine having at least one processor, storage, and a communication platform connected to a network, is disclosed. A first browser is initiated running on a first device in response to a user's request. A choice is requested from the user as to with which device the first browser is to be synchronized. The choice is received from the user indicating a second device with which the first browser is to be synchronized. A request is sent to a server requesting a stored state of a second browser associated with the second device. The stored state of the second browser is received, wherein the stored state includes information that enables the first browser to synchronize. The second browser is rendered in accordance with the stored state. A current state of the second browser is generated. The current state of the second browser is sent to the server.

Other concepts relate to software for implementing the network appliance. A software product, in accord with this concept, includes at least one machine-readable non-transitory medium and information carried by the medium. The information carried by the medium may be executable program code and/or data regarding parameters in association with the network appliance operational parameters, such as information related to a configuration etc.

In one example, a machine-readable tangible and non-transitory medium having information recorded thereon, wherein the information, when read by a machine, causes the machine to perform a method of seamless browsing is disclosed. A browser state is received, by a server, from a first browser running on a first device. The received browser state is stored by the server. A request for the stored browser state of the first browser is received, by the server, from a second browser running on a second device. The stored browser state associated with the first browser is retrieved by the server. The retrieved browser state of the first browser is sent, by the server, to the second browser.

In another yet example, a machine-readable tangible and non-transitory medium having information recorded thereon, wherein the information, when read by a machine, causes the machine to perform a method of seamless browsing is disclosed. A browser is initiated running on a device. A request from a user is received. A first current state of the browser is generated. The first current state of the browser is sent to a server. One or more pieces of content are identified based on the request. At least one of the one or more pieces of content is displayed to the user.

In another yet example, a machine-readable tangible and non-transitory medium having information recorded thereon, wherein the information, when read by a machine, causes the machine to perform a method of seamless browsing is disclosed. A first browser is initiated running on a first device in response to a user's request. A choice is requested from the user as to with which device the first browser is to be synchronized. The choice is received from the user indicating a second device with which the first browser is to be synchronized. A request is sent to a server requesting a stored state of a second browser associated with the second device. The stored state of the second browser is received, wherein the stored state includes information that enables the first browser to synchronize. The second browser is rendered in accordance with the stored state. A current state of the second browser is generated. The current state of the second browser is sent to the server.

Additional advantages and novel features will be set forth in part in the description that follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 18 depicts a general computer architecture on which embodiments of the disclosure can be implemented.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Embodiments of the disclosure solve the problem of isolation and fragmentation between devices by enabling real-time connectedness among multiple devices of a user. This browser-based solution connects a user's devices together in the context of search and browsing the Internet, enabling the user to continue effortlessly from one device to another with simple access to searching and browsing data from any device.

Embodiments of the disclosure allow a user to start browsing the Internet on their desktop in their office, grab their tablet to sit on their couch and effortlessly continue the session they started on their desktop to their tablet. Embodiments of the disclosure allow the state of the browser to persist from device to device, shifting the search and browse paradigm from being device centered to user centered.

Embodiments of the disclosure allow a user to login to and use a seamless browser, subsequently storing and associating the users browser history, search history, and browser state to a user identification of the user. A user can then login through the seamless browser-on any other device granting them access to their browser history, search history, and browser state.

Figure 1:
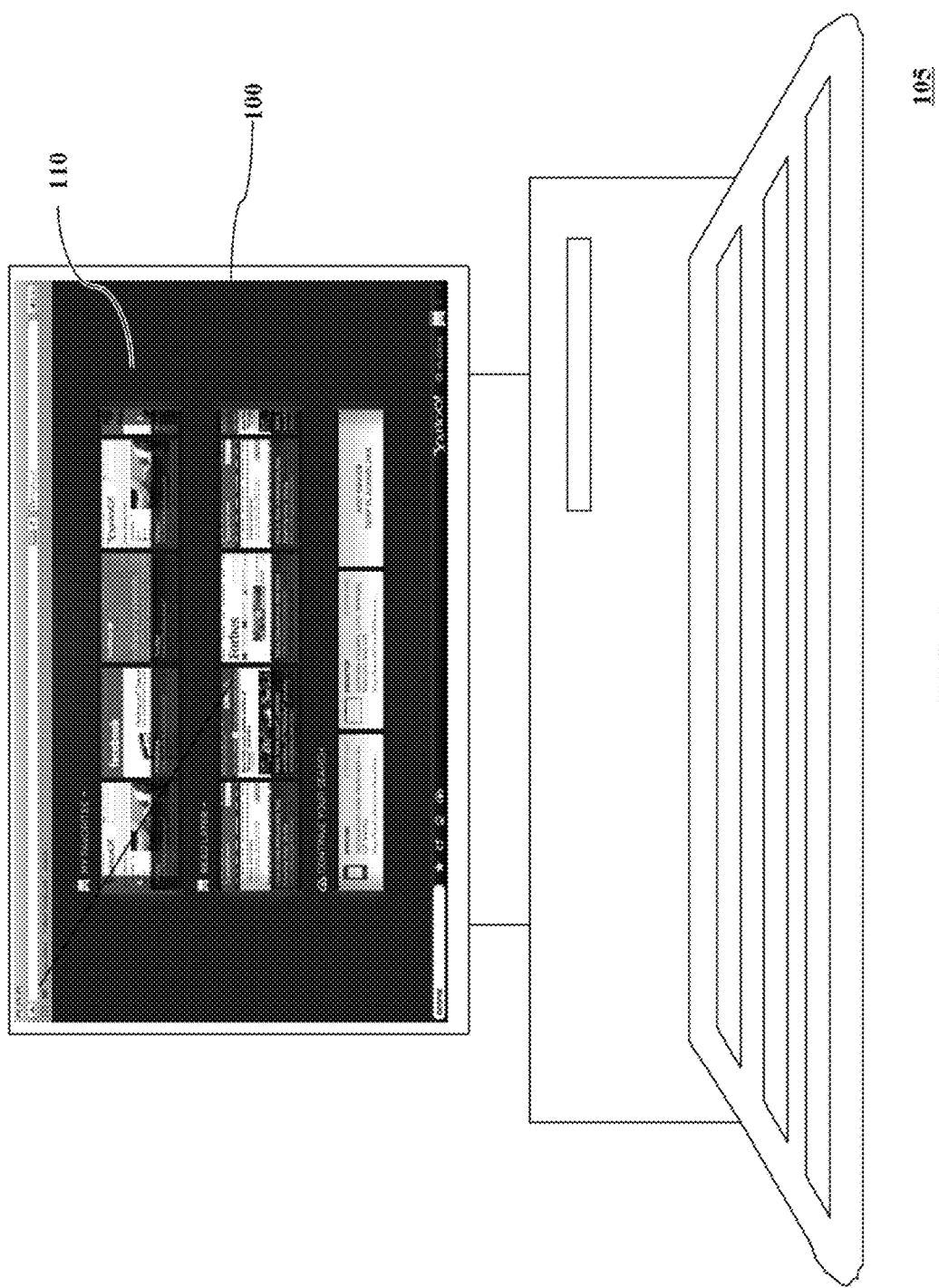
FIG. 1 depicts a seamless browser on a personal computer according to an embodiment of the present teaching.

FIG. 1 depicts a seamless browser 100 on a personal computer (PC) 105 according to an embodiment of the present teaching. The seamless browser 100 on the PC 105 is an Internet browser that allows a user to download and view pages on the Internet. The seamless browser 100 continuously collects activities by the user, web pages visited, cookies collected, positions on pages viewed, etc. The seamless browser 100 stores the collected activities. In some embodiments, the seamless browser 100 stores the collected activities locally on the PC 105. In some embodiments, the activities are stored on a remote server. In some embodiments, the activities are stored locally on the PC 105 until a connection to a remote server is made. When the connection to the remote server is made, the activity stored locally on the PC 105 are transferred to the remote server. When the seamless browser 100 is closed, the activities stored remained on the PC 105 or the remote server. When the seamless browser 100 is activated, the seamless browser 100 loads the stored activities to return the seamless browser 100 to the state the seamless browser 100 was in when closed by the user. The seamless browser 100 may also be requested to load a state of a similar seamless browser on another device.

The seamless browser 100 stores and associates information associated with browsing with a user identification of the user. Upon every page load by the seamless browser 100, the seamless browser 100 stores, for example, the device type of the device the seamless browser 100 is operating on, a timestamp of the time the page was loaded, the title of the last viewed web page, the uniform resource locator (URL) of the last viewed web page, the last submitted web query, and a change in search view state. When the user logs into the seamless browser 100, the user has access to view stored information regarding other devices with seamless browsers associated with an account of the user. The information from another device that the user can view includes the device type of the other device and the device name. The device name may have been specified by the user, and in the case that a user has multiple devices of the same type, for example, multiple desktops, the device name will be used to differentiate the devices. On each device the viewable items include, the search query history, and the viewed pages and browser history. The user may load the last page visited on any other device with a seamless browser on which the user has an account. The user may view and load the last query on each device, the last page loaded based on the URL and the title of the last web page that was viewed, and a timestamp of the last state stored.

The seamless browser 100 is a custom developed browser application for a PC, tablet device, mobile device, gaming machine, and television. The seamless browser 100 can be offered in the form of a browser plugin/extension, TV widget, and fully functional web browser application. Each version of the seamless browser 100 is adapted to the device on which it is installed. Further, each version of the seamless browser 100 is adapted to display web pages, browser history, and search history in a manner compatible with the device on which the seamless browser is installed. Thus, the seamless browser 100 adapts the content viewed to different screen sizes and input methods a required by the device.

The user has the ability to access stored search query history from any seamless browser 100 by viewing the search history feature where the user can view all search query history and filter the search query history by device or date. The user has the ability to access browser history for any seamless browser 100 by viewing the browser history feature where the user can view all browser history and filter the history by device or date.

The start page 110 is accessible when the user opens a new tab or presses, for example, a 'home' button. The start page 110 allows a user to load the browsing state of the seamless browser 100 on another device by selecting a device, the last site visited from a history, or a list of previous queries. In some embodiments, selecting the state of another device does not change the state on the selected device. In some embodiments, the state of the selected device follows the state of the device to which the state is transferred.

Figure 2:
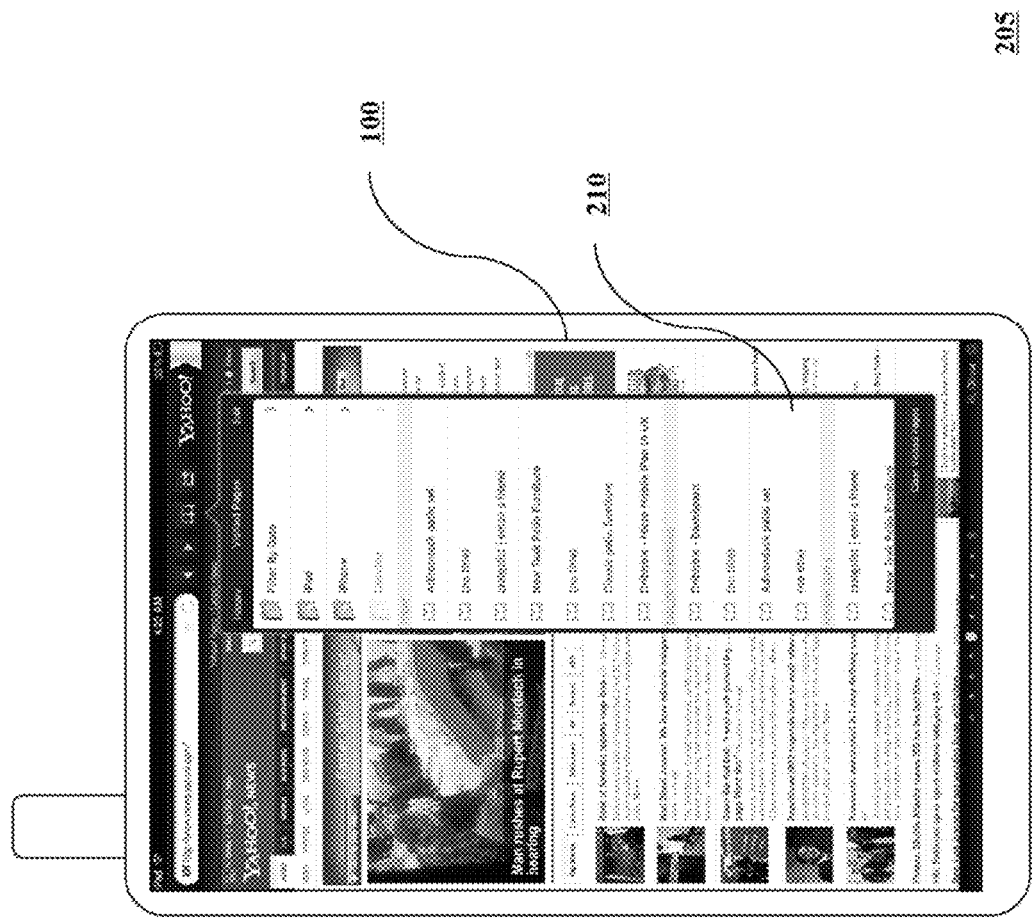
FIG. 2 depicts a seamless browser on a mobile phone according to an embodiment of the present teaching.

FIG. 2 depicts a seamless browser 100 on a mobile phone according to an embodiment of the present teaching. The seamless browser 100 comprises a page history menu 210. The seamless browser 100 on the mobile phone 205 is an Internet browser that allows a user to download and view pages on the Internet. The seamless browser 100 continuously collects activities by the user, web pages visited, cookies collected, positions on pages viewed, etc on the mobile phone 205. The seamless browser 100 stores the collected activities. In some embodiments, the seamless browser 100 stores the collected activities locally on the mobile phone 205. In some embodiments, the activities are stored on a remote server. In some embodiments, the activities are stored locally on the mobile phone 205 until connection to a remote server is made, when the connection to the remote server is made, the activity stored locally on the mobile phone 205 are transferred to the remote server. When the seamless browser 100 is closed, the activities stored remained on the mobile phone 205 or the remote server. When the seamless browser 100 is activated, the seamless browser 100 loads the stored activities to return the seamless browser 100 to the state the seamless browser 100 was in when closed by the user. The seamless browser 100 may also be requested by the user to load a state of a similar seamless browser on another device. For example, if the user previously used the seamless browser on the PC 105, then the user may request the seamless browser 100 on the mobile phone 205 to retrieve the last state of the seamless browser 100 on the PC 105.

The page history menu 210 allows a user to see and select from page histories on any seamless browser of any device registered to the user. For example, if the user is using the mobile phone 205, the user can select pages from the PC 105 browser history. The page history menu 210 may be available on any device with the seamless browser 100

Figure 3:
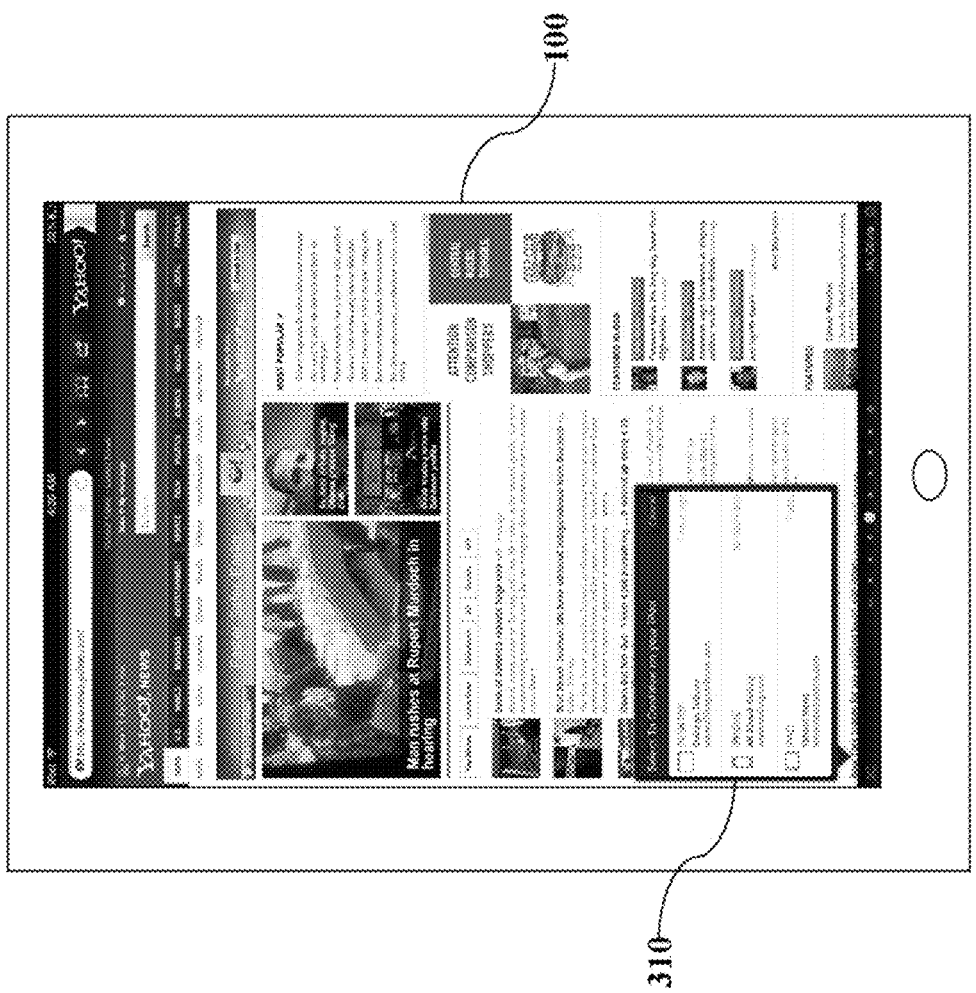
FIG. 3 depicts a seamless browser on a tablet PC according to an embodiment of the present teaching.

FIG. 3 depicts a seamless browser 100 on a tablet PC according to an embodiment of the present teaching. The seamless browser 100 further comprises a device menu 310. The seamless browser 100 on the tablet PC 305 functions in a similar manner to the seamless browser 100 on the mobile phone 205 and the PC 105. The seamless browser 100 on the tablet PC 305 stores the state of the seamless browser 100 in a similar manner, and may be synchronized to a previous state of the seamless browser 100 on the tablet PC 305, or any other device, including the PC 105 and the mobile phone 205.

The device menu 310 allows a user to see and select from devices on any seamless browser of any device registered to the user. For example, if the user is using the tablet PC 305, the user can select to load the browser state of any of the other devices listed in the device menu 310. The device menu 310 may be available on any device with the seamless browser 100.

Figure 4:
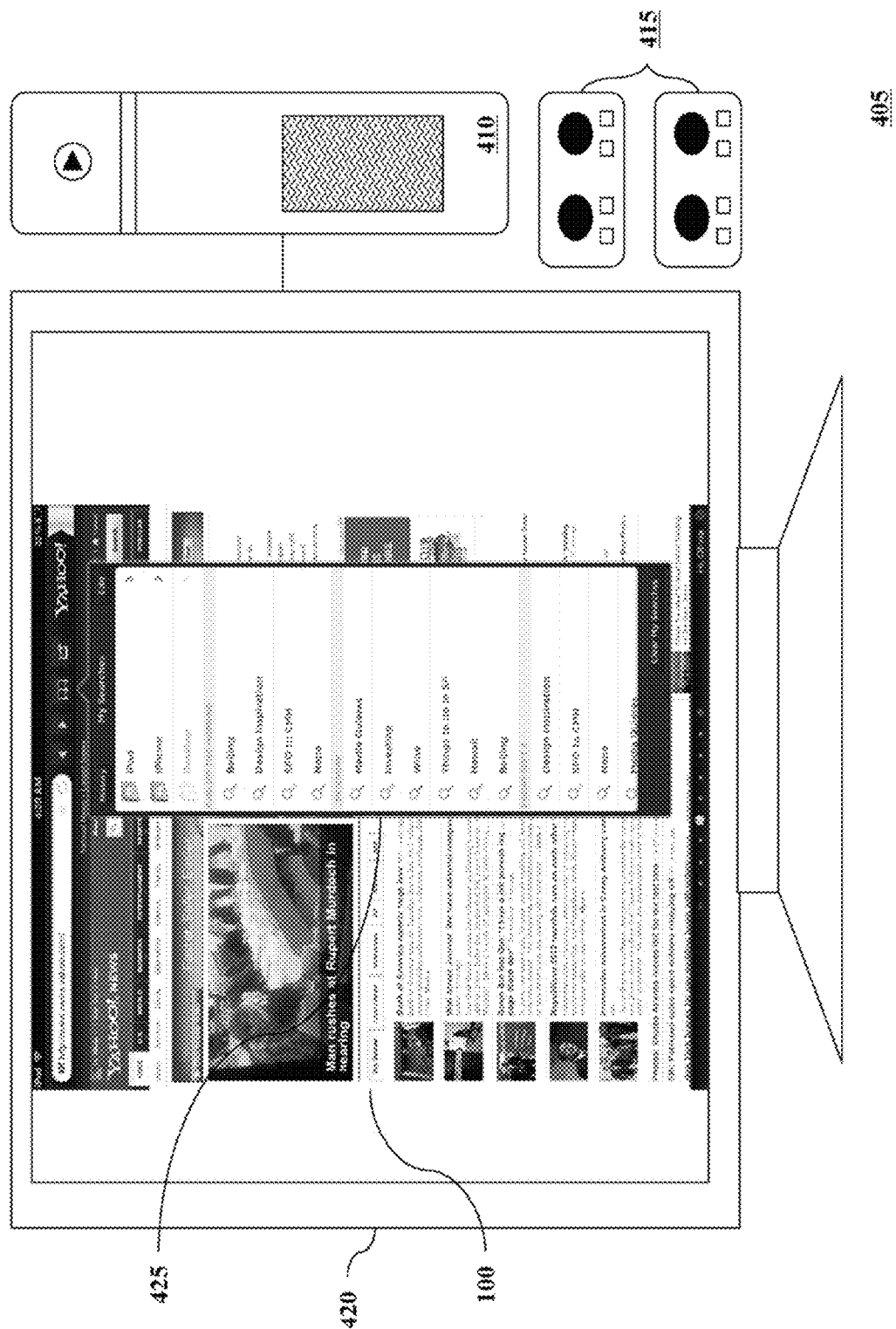
FIG. 4 depicts a seamless browser on a gaming machine according to an embodiment of the present teaching.

FIG. 4 depicts a seamless browser 100 on a gaming machine according to an embodiment of the present teaching. The seamless browser 100 comprises a search history menu 425. The seamless browser 100 on the gaming machine 405 functions in a similar manner to the seamless browser 100 on the tablet PC 305, the mobile phone 205, and the PC 105. The seamless browser 100 on the gaming machine 405 stores the state of the seamless browser 100 in a similar manner, and may be synchronized to a previous state of the seamless browser 100 on the gaming machine 405, or any other device, including the PC 105, the mobile phone 205, and the tablet PC 305. The gaming machine 405 comprises a game machine console 410, game machine controllers 415, and a display 420.

Thus, the user that owns for example, the PC 105, the mobile phone 205, the tablet PC 305, and the gaming machine 405 can move between the above devices and synchronize previous browsing states between the machines. The user can begin a browsing session on the mobile phone 205, and upon arrival at a work location, continue the browsing session on a work PC. En route home, the user can continue the browsing session from the work PC on the mobile, phone 205. Upon arriving home, the user can then continue either the same browsing session on the gaming machine 405 or for example an Internet TV with a seamless browser 100. The synchronization of the browsing state on the remote server allows the user to maintain an effective single browsing session across multiple devices in multiple locations. As well as the immediate state of the browser, the history, cookies, and favorites of the browsing sessions are also stored and retrieved from the remote server. Thus, upon transferring from one device to another, the user, not only sees the previous state of the browser on another machine but also the same history, favorites, etc. Moreover, because cookies are also maintained across platforms, functionalities of previous web pages and current web pages are maintained as the user transfers between platforms. As an example, the effects of pushing a back button on the seamless browser 100 to retrieve a previous page is independent of which device the user carries out this operation. An example of such functionality occurs, when a user clicks on a link some way down an Internet page, and a new web page is displayed. If the user pushes the back up on the browser, in many instances the previous page will appear, but also be scrolled to the position where the user clicked on the link to move to the next page. The seamless browser 100 allows such functionality to be transferred between different devices and platforms while browsing.

The search history menu 425 allows a user to see and select search histories on any seamless browser of any device registered to the user. For example, if the user is using the gaming machine 405, the user can select pages from the search history of the PC 105. The search history menu 425 may be available on any device with the seamless browser 100.

Figure 5:
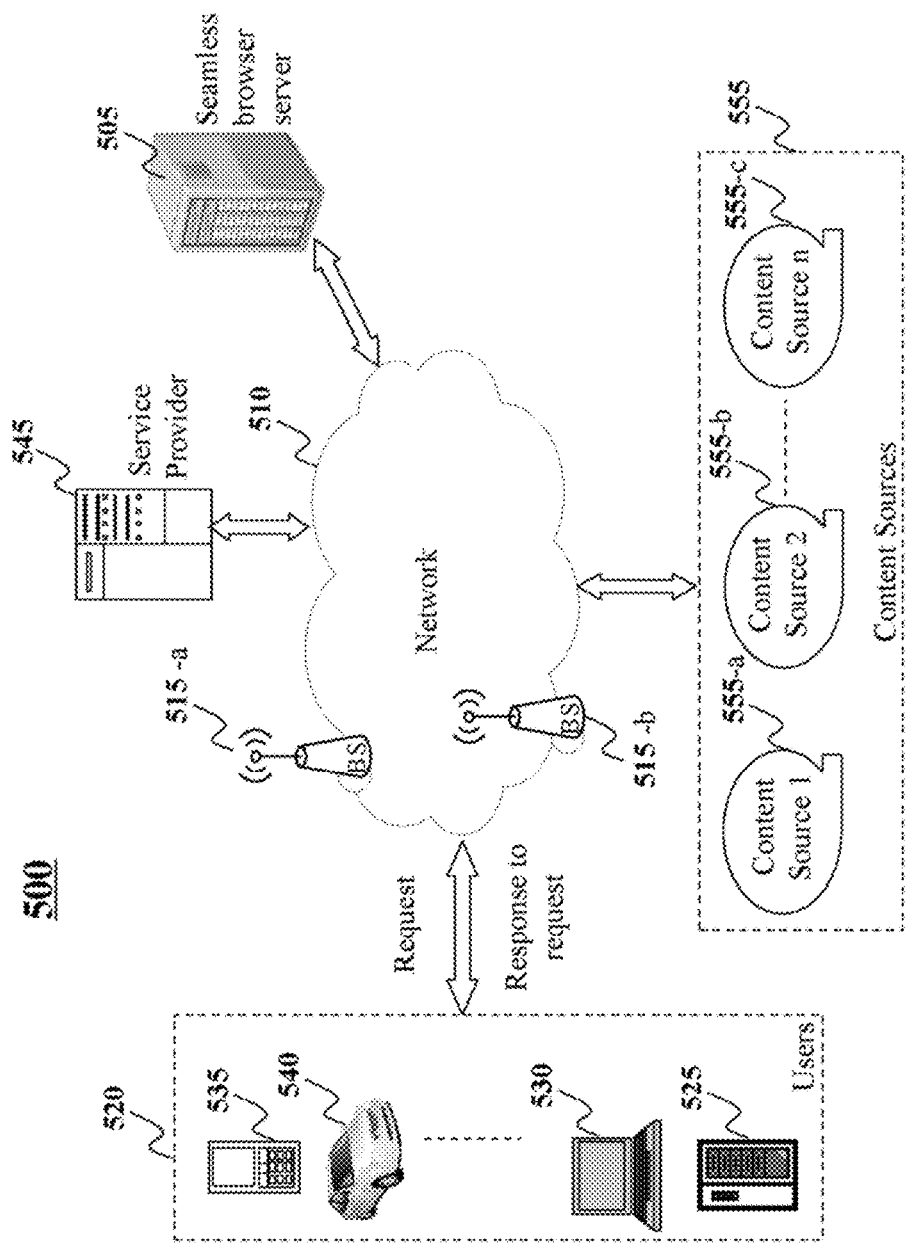
FIG. 5 depicts a system including a seamless browser server according to an embodiment of the present teaching.

FIG. 5 depicts a system 500 including a seamless browser server 505 according to an embodiment of the present teaching. The system 500 comprises the seamless browser server 505, network 510, users 520, a service provider 545, and content sources 555. The system 500 allows users to send requests for content, for example, web pages to the service provider 545 via the network 510. The requests are received by the service provider 545. The service provider 545 responds to the requests by providing the requested content to the respective users 510 via the network 510. The service provider 545 incorporates content obtained from the content sources 555.

The seamless browser server 505 allows seamless browsers on the devices of the users 520 to store and synchronize the seamless browsers on those devices to one another. In some embodiments, the synchronization to the seamless browser server 505 is provided via the service provider 545 based on requests from the seamless browsers on the devices of the users 520. In some embodiments, the seamless browsers communicate directly with the seamless browser server 505 to synchronize the seamless browsers independent of the service provider 545.

The network 510 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof.

The network 510 comprises wired or wireless access points 515 that allow a data source connect to the network 510 in order to transmit information via the network 510.

The users 520 may send a request to the service provider 545 via the network 510 and receive a request result from the service provider 545 through the network 510. The requests may be sent from a seamless browser on the device of the user, for example, the seamless browser 100 or from any other browser. Thus, if the browser on the device is a seamless browser 100, the seamless browser 100 may synchronize its data as discussed above, with the seamless browser server 505, either via a service provider, for example, the service provider 545 or directly across the network 510. The users 520 comprise users connected to the network via desktop connections 525, users connecting to the network via wireless connections such as through a laptop 530, connecting to the network via a handheld device 535, and connecting to the network via a built-in device in a motor vehicle 540.

The service provider 545 receives the request for content from a user. The service provider 545 may provide the requested content to the user from content sources within the service provider 545 or the service provider 545 may retrieve the content requested from the content sources 555. The service provider 545 may combine content from more than one source to fulfill the request.

The content sources 555 may include multiple content sources 555-*a*, 555-*b*, . . . , 555-*c*. may correspond+ to a web page host corresponding to an entity. The web page host may be an individual, a business, or an organization such as USPTO.gov, a content provider such as cnn.com and Yahoo. com, or a content feed source such as tweeter or blogs. The service provider 545 may rely on such information to respond to a request from a user 520, for example, the service provider 545 may provide web content corresponding to the request and return the web content to the user 520.

Figure 6:
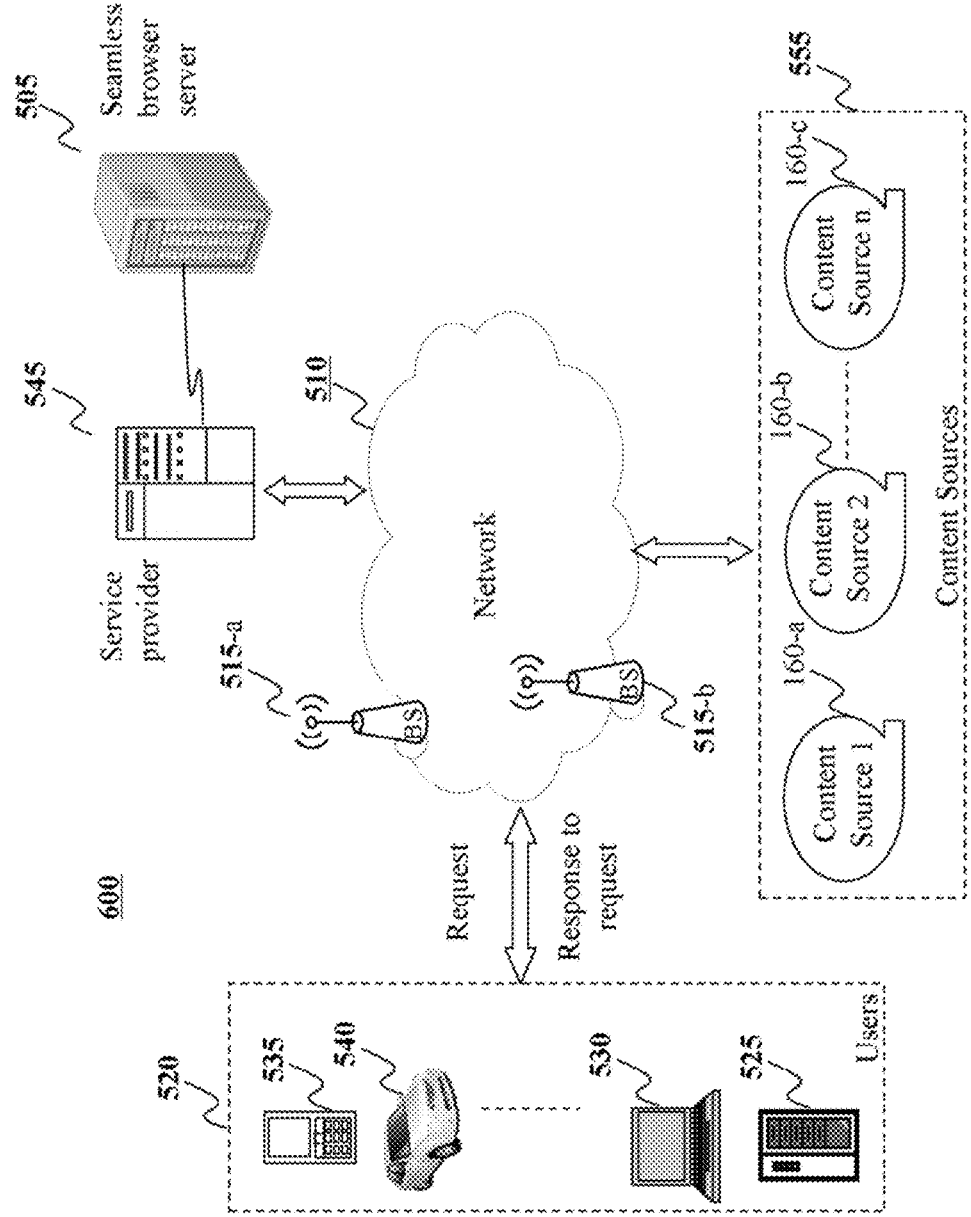
FIG. 6 depicts a system including a seamless browser server according to an embodiment of the present teaching.

FIG. 6 depicts a system 600 including a seamless browser server according to an embodiment of the present teaching. The system 600 comprises a seamless browser server 505, users 520, a network 510, a service provider 545, and content sources 555. The system 600 allows users to send requests for content, for example, web pages to the service provider 545 via the network 510. The requests are received by the service provider 545. The service provider 545 responds to the requests by providing the requested content to the respective users via the network 510. The service provider 545 incorporates content obtained from the content sources 555.

The seamless browser server 505 is connected to the service provider 545 and acts as a backend server to the service provider 545. Each seamless browser 100 on a user device accesses the seamless browser server 505 by the service provider 545.

Figure 7:
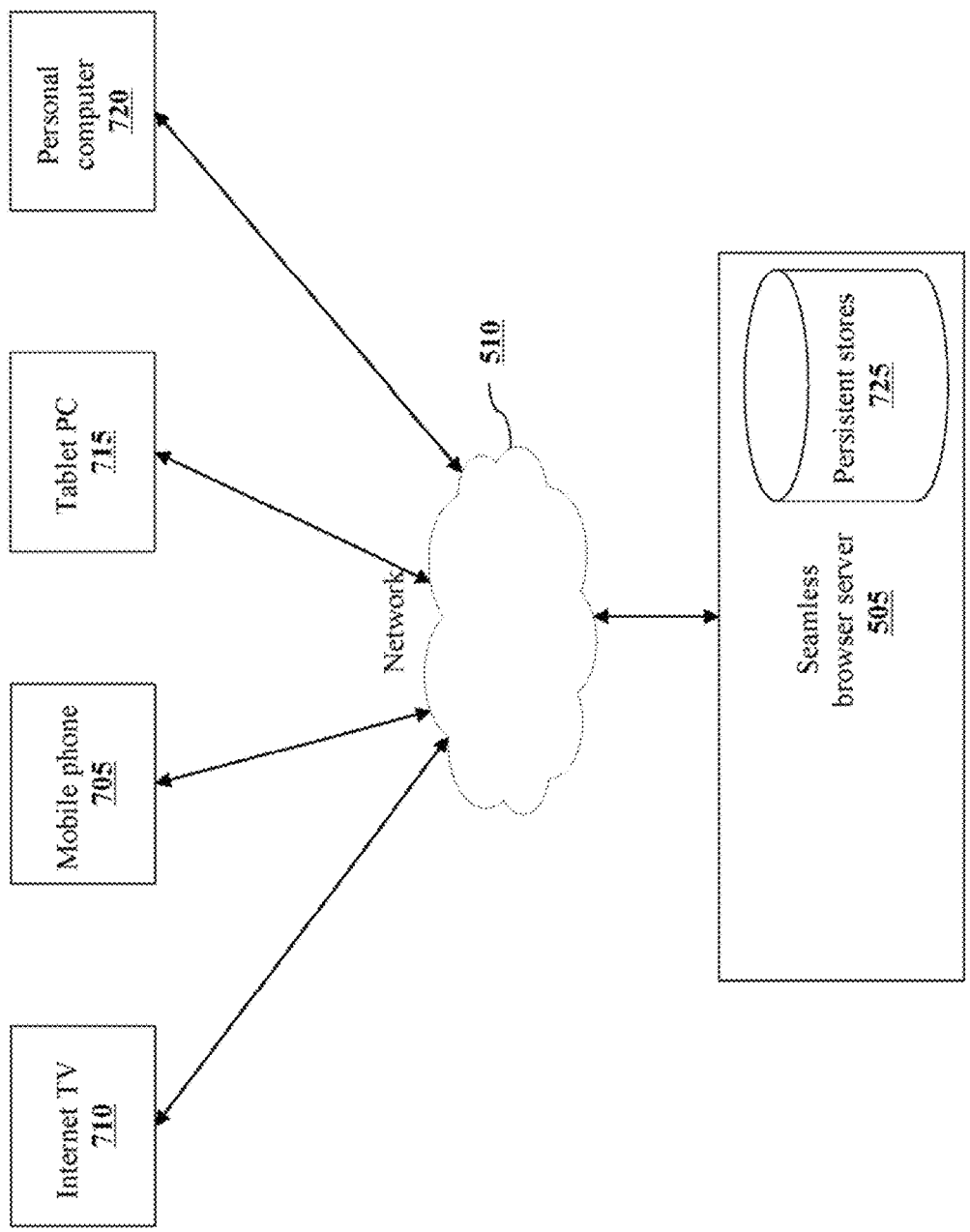
FIG. 7 depicts a system for seamless browsing between devices according to an embodiment or the present teaching.

FIG. 7 depicts a system 700 for seamless browsing between devices according to an embodiment of the present teaching. The system 700 comprises the seamless browser server 505, a mobile phone 705, an Internet TV 710, a tablet PC 715, a personal computer 720, the network 510, and user persistent store 725.

FIG. 7 depicts a situation when the devices belonging to the same user. The user is the operator of the mobile phone 705, the internet TV 710, the tablet PC 715, and the personal computer 720. Each device has a seamless browser 100. Each seamless browser 100 updates the user persistent store 725 each time an activity such as browsing, searching etc. is performed on the device. In some embodiments, the update includes the device name, the device type, the user ID etc. The browser activity stored in the user persistent store 725 includes for example pages browsed with time-stamps etc., search activity such as queries with time-stamps, etc., bookmarks with the page and description etc., and the last session with status and time-stamp, etc. Thus, the user persistent store 725 has information regarding the current state and history of the seamless browsers 100 on the devices 705, 710, 715, and 720. The seamless browsers on the devices 705, 710, 715, and 720 use the information in the user persistent store 725 to build the start page 110, the page history menu 210, the device menu 310, and search history menu 425 when requested by a user. The information in the user persistent store 725 is used to update a seamless browser 100 with information from another device such as browser state, search history, or page history when requested by the user. Thus, the user persistent store 725 allows the seamless browsers 100 on all of the devices of the user to be kept in sync. The user persistent store 725 may comprise a number of storage locations on the local device and on seamless browser servers 505 distributed across various networks. In some embodiments, the combination of these local stores and seamless browser servers 505 forms the user persistent store 725.

Figure 8:
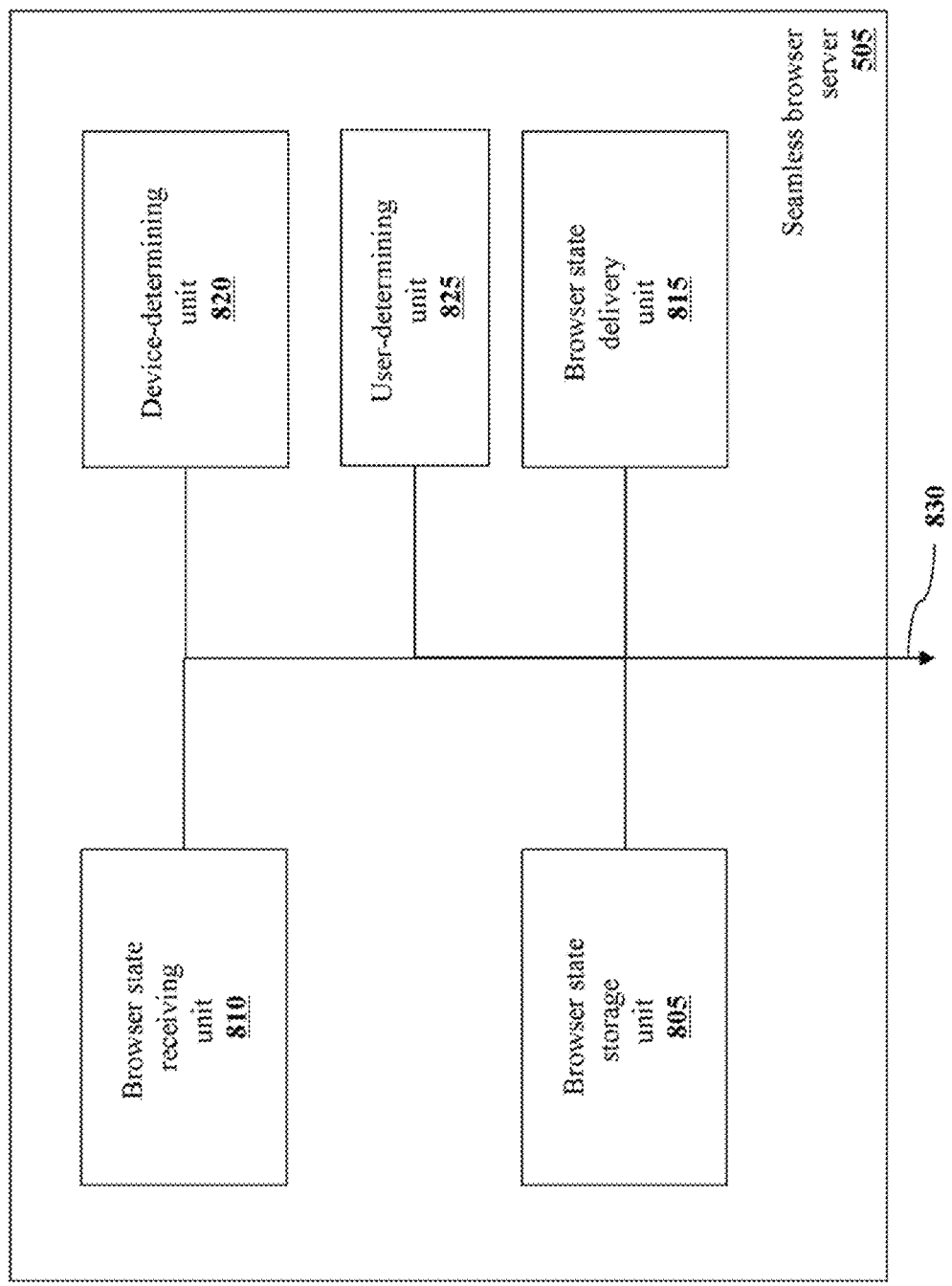
FIG. 8 depicts a seamless browser server for providing seamless browsing between devices according to an embodiment of the present teaching.

FIG. 8 depicts a seamless browser server 505 for providing seamless browsing between devices according to an embodiment of the present teaching. The seamless browser server 505 comprises a browser state storage unit 805, a browser state receiving unit 810, a browser state delivery unit 815, a device determining unit 820, a user determining unit 825, and a network connection 830.

The browser state storage unit 805 stores the states of browsers for users. The state of each browser for each device of each user is stored as a separate record. In some embodiments, the stored state of each browser is protected so that only authorized staff and the user can access the state. Each state is stored in such a manner that the user and the device that the browser state is from, can be identified. The browser activity stored in the browser state storage unit 805 includes, for example, pages browsed with time-stamps etc., search activity such as queries with time-stamps, etc., bookmarks with the page and description etc., and the last session with status and time-stamp, etc.

The browser state receiving unit 810 receives new states and activity from the seamless browsers 100 of users. The browser state receiving unit 810 queries the device-determining unit 820 to determine the device that the browser sending the activity is located on based on the new states and activity data received. The browser state receiving unit 810 queries the user-determining unit 825 to determine the user that the browser sending the activity belongs to based on the new states and activity data received. Based on the user and the device, the browser state receiving unit 810 updates the stored state for the user and the device in the browser state storage unit 805.

The browser state delivery unit 815 receives requests from seamless browsers 100 on devices of users. The requests may be for information of the state of a browser on a device of the user different from the device of the browser making the request. The browser state delivery unit 815 queries the device-determining unit 820 to determine the device that the browser sending the activity is located on. The browser state receiving unit 810 queries the user-determining unit 825 to determine the user that the browser sending the activity belongs to. The browser state delivery unit 815 further queries the device determining unit 820 and the user determining unit 825 to determine if the seamless browser 100 state request is for a device that belongs to the same user as the device of the seamless browser 100 making the request. If the requesting seamless browser 100 and the seamless browser 100 for which the request is made belong to the same user then the browser state delivery unit 815 obtains the state of the seamless browser requested and sends the state of the browser requested to the seamless browser 100 that made the request.

The device-determining unit 820 determines the device based on information provided by the browser state receiving or delivery unit 810, 815. The information may include, for example, a MAC address of the device, an IP address of the device, or any other identifier related to the device that can identify the device. The identifier may be an identifier placed on the device by the seamless browser 100 when the seamless browser 100 was installed on the device. The device-determining unit 820 is also capable of determining the user of a device based on the device identity.

The user-determining unit 825 determines the user based on information provided by the browser state receiving or delivery unit 810, 815. The information may include, for example, hardware information such as a MAC address of the device of the user, an IP address of the device of the user, or any other identifier related to the device of the user that can identify the device and hence the user. The identifier may be an identifier for the user placed on the device by the seamless browser 100 when the user first logged into the seamless browser 100 on the device. The user-determining unit 825 is also capable of determining the devices of a user based on the user identity. If a device has more than one user with an account then the user-determining unit 825 relies on more than just the device identity to determine the user.

Figure 9:
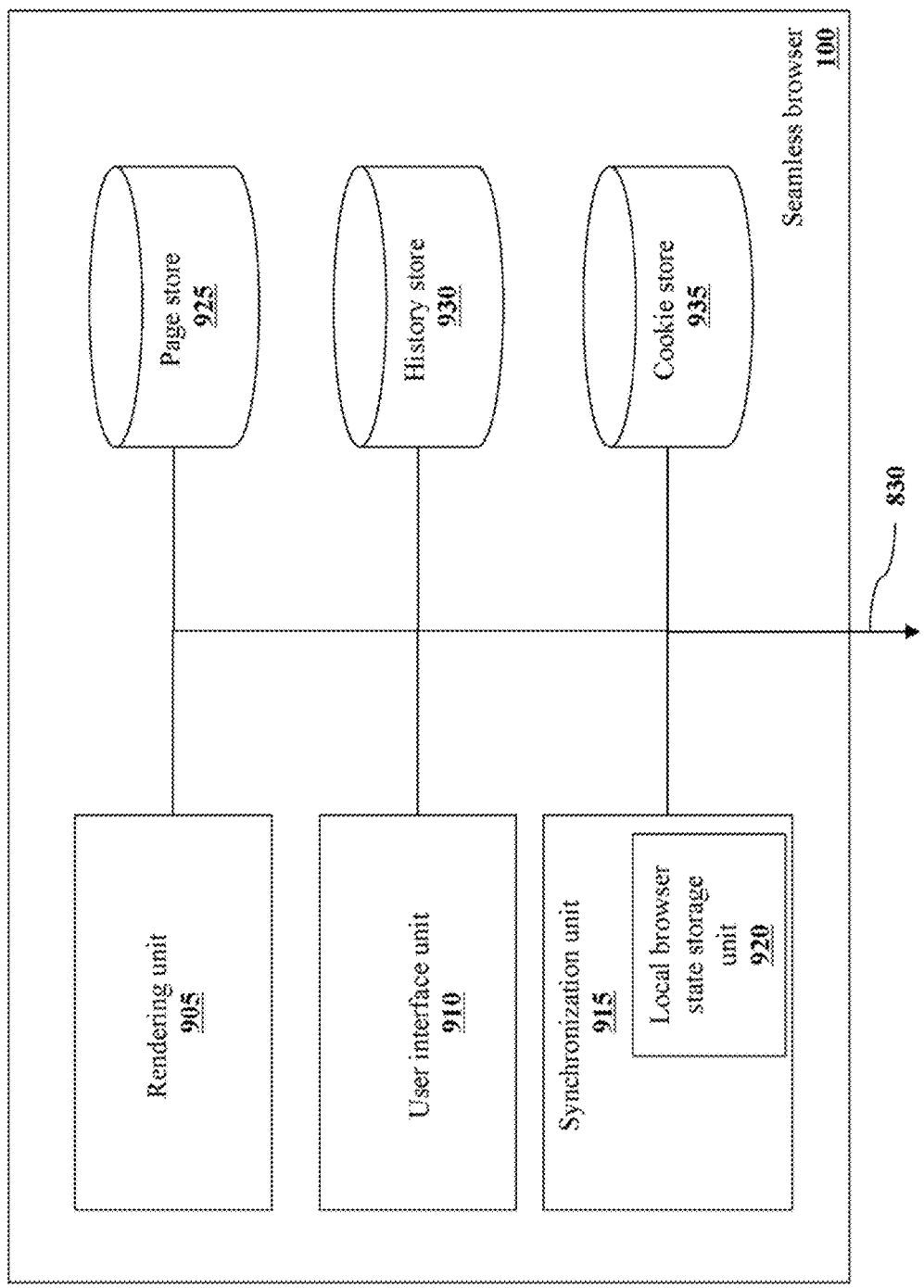
FIG. 9 depicts a seamless browser for seamless browsing between devices according to an embodiment of the present teaching.

FIG. 9 depicts a seamless browser 100 for seamless browsing between devices according to an embodiment of the present teaching. The seamless browser 100 comprises a rendering unit 905, a user interface unit 910, a synchronization unit 915, a page store 925, a history store 930, a cookie store 935, and a network 830. The synchronization unit 915 comprises a local browser state storage unit 920.

The rendering unit 905 converts web pages and searches received by the seamless browser 100 into graphics that can be displayed on a screen of the device that the seamless browser 100 is installed on. In some embodiments, the rendering unit 905 may make extensive use of graphics APIs already installed on the device, for example, in an operating system on the device. The rendering unit 905 is further adapted to display information in the device according to the device specification. Thus, the rendering unit 905 may adapt web pages and other information to fit a larger of smaller screen size, resolution, etc. than on other devices of the user.

The user interface unit 910 converts input from the user of the device into commands for the seamless browser 100. The input may be in the form of keyboard strokes, mouse, touch pad, or trackball motion, voice command and sound input, pictures, camera and video input, and input from other sensors such as acceleration, GPS, etc.

The page store 925 stores pages viewed by the user so that pages viewed can be retrieved rapidly. Further, pages that have already been viewed may be recalled even when the user is not connected to the network 830. The history store 930 stores the locations of pages viewed by the user, so that the user can view those pages by searching the history of pages viewed or by pushing a "back" button on the seamless browser 100 or performing an equivalent operation to the back button. The cookie store 935 stores cookies associated with browsing activity.

The synchronization unit 915 sends activity of the user to the seamless browser server 505 for storage in the browser state storage unit 805. The synchronization unit 915 sends, for example, pages browsed with time-stamps etc., search activity such as queries with time-stamps, etc., bookmarks with the page and description etc., and the last session with status and time-stamp, etc. If the device is not connected to the seamless browser server, for example, because of lack of a cell phone signal, or because the seamless browser server 505 is unavailable, the synchronization unit 915 locally stores the information in local browser state storage unit 920 until a connection is restored. When the connection is restored, the synchronization unit 915 transfers the contents of the local browser state storage unit to the seamless browser server 505.

The synchronization unit 915 also connects to the seamless browser server 505 to retrieve the browser state of other browsers belonging to the user if the user requests to view or load those states. The synchronization unit 915 may retrieve information from the seamless browser server 505 and add the information to, or replace information in the page store 925, the history store 930, and the cookie store 935 upon request from the user.

Figure 10:
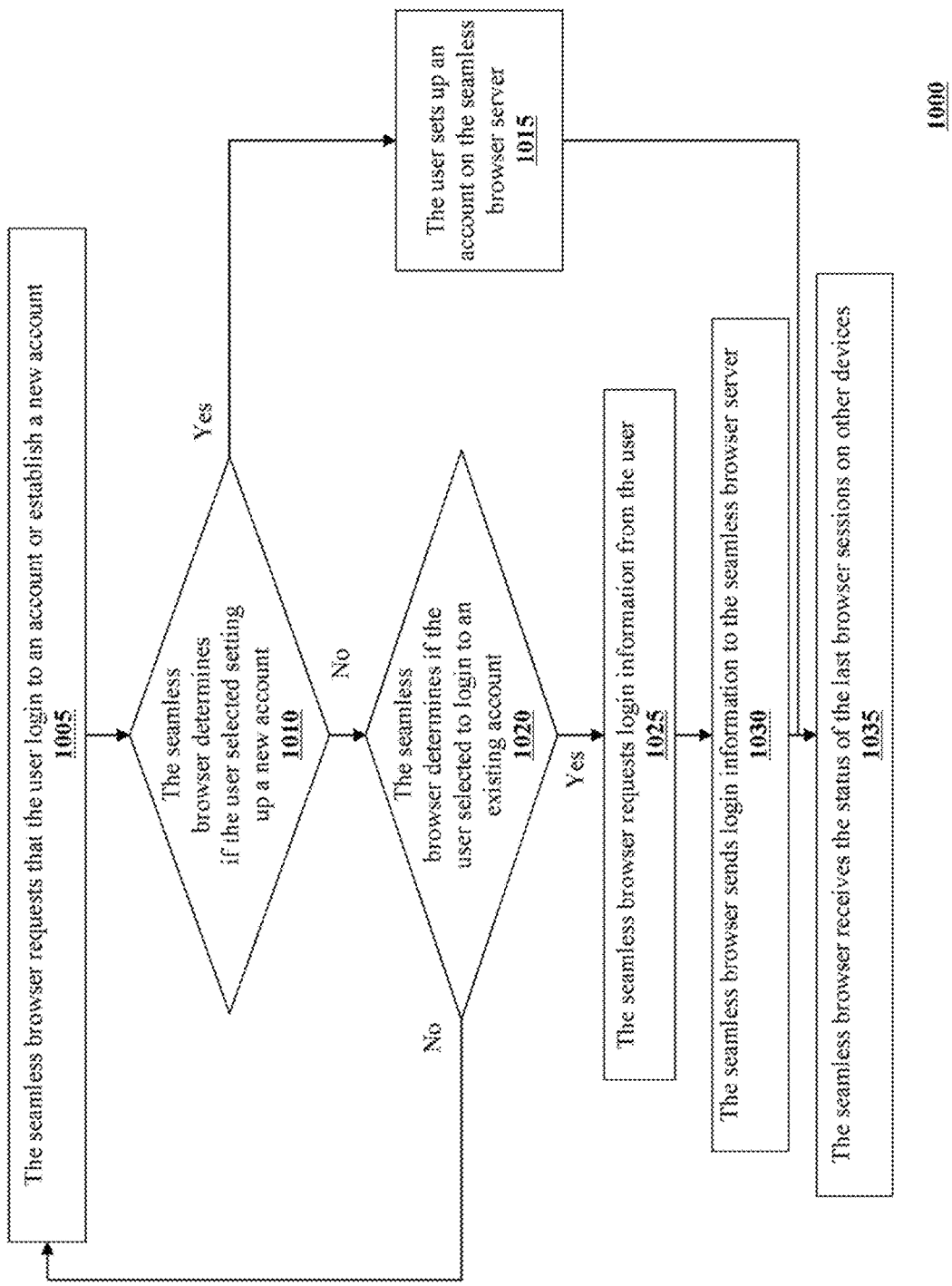
FIG. 10 depicts a flow chart for a method for a user to access the seamless browser for the first time on a device according to an embodiment of the present teaching.

FIG. 10 depicts a flow chart for a method 1000 for a user to access the seamless browser for the first time on a device according to an embodiment of the present teaching. The method 1000 begins at step 1005. At step 1005, the seamless browser requests that the user login to an account or establish a new account. The user may chose to login or set up an account by selecting links, pressing keys etc. In some embodiments, when the user has already logged in or set up an account on the device previously, the browser may automatically login using the previous credentials. To login the user may have to provide a user ID and password. To set up an account the user may have to provide a new user ID and set up a new password. The user new ID may be provided by the seamless browser server 505. The user may need to be connected to the seamless browser server 505 to set up a new account. The user may not be required to be connected to the seamless browser server 505 to login to the seamless browser.

At step 1010, the seamless browser determines if the user selected setting up a new account. If the user is setting up a new account the method proceeds to step 1015. If the user is not setting up a new account, the method proceeds to step 1020.

Figure 12:
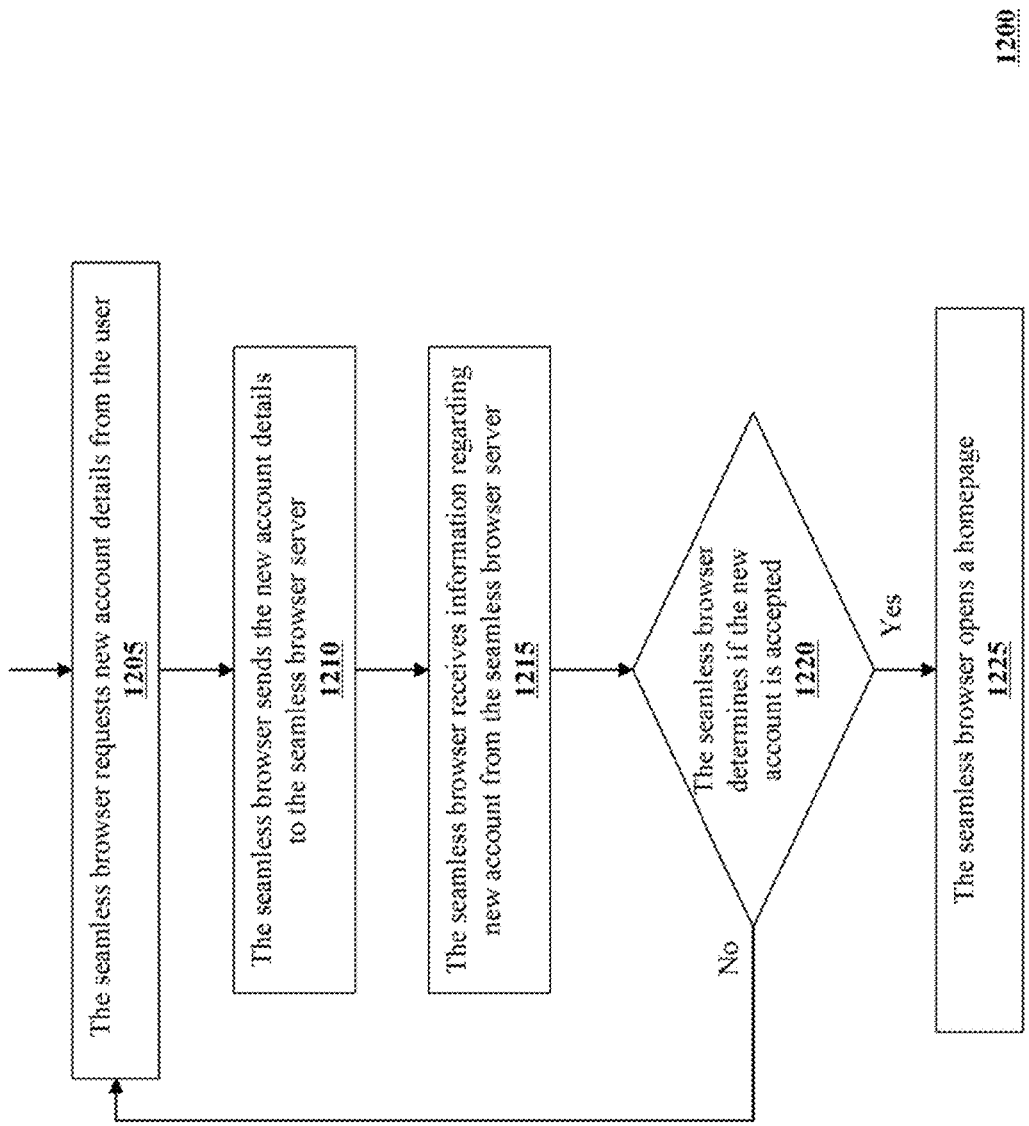
FIG. 12 depicts a flow chart for a method for a user to set up a new account on a device according to an embodiment of the present teaching.
Figure 13:
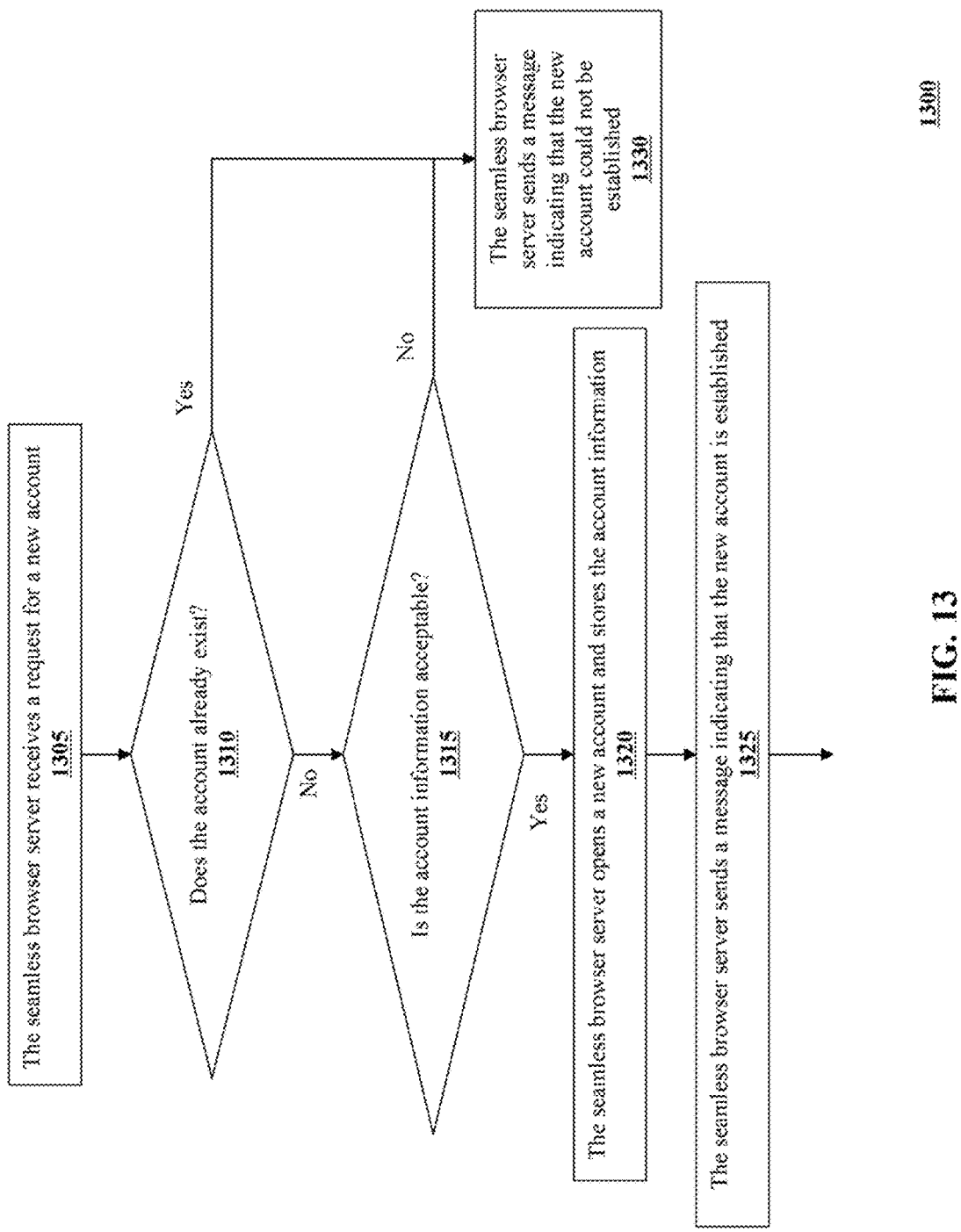
FIG. 13 depicts a flow chart for a method for setting up a new account according to an embodiment of the present teaching.

At step 1015, the user sets up an account on the seamless browser server. The process for setting up a new account is shown in FIGS. 12 and 13.

At step 1020, the seamless browser determines if the user selected logging into an existing account. If the user selected logging into an existing account, the method proceeds to step 1025. If the user did not selected logging into an existing account the method 1020 repeats from step 1005.

At step 1025, the seamless browser requests login information from the user. At step 1030, the seamless browser sends the login information to the seamless browser server.

At step 1035, the seamless browser receives the status of the last browser sessions on other devices. If the user has just set up a new account the seamless browser 100 may receive a standard or customized web page with, for example welcome information or startup instructions rather than the status of other devices.

Figure 11:
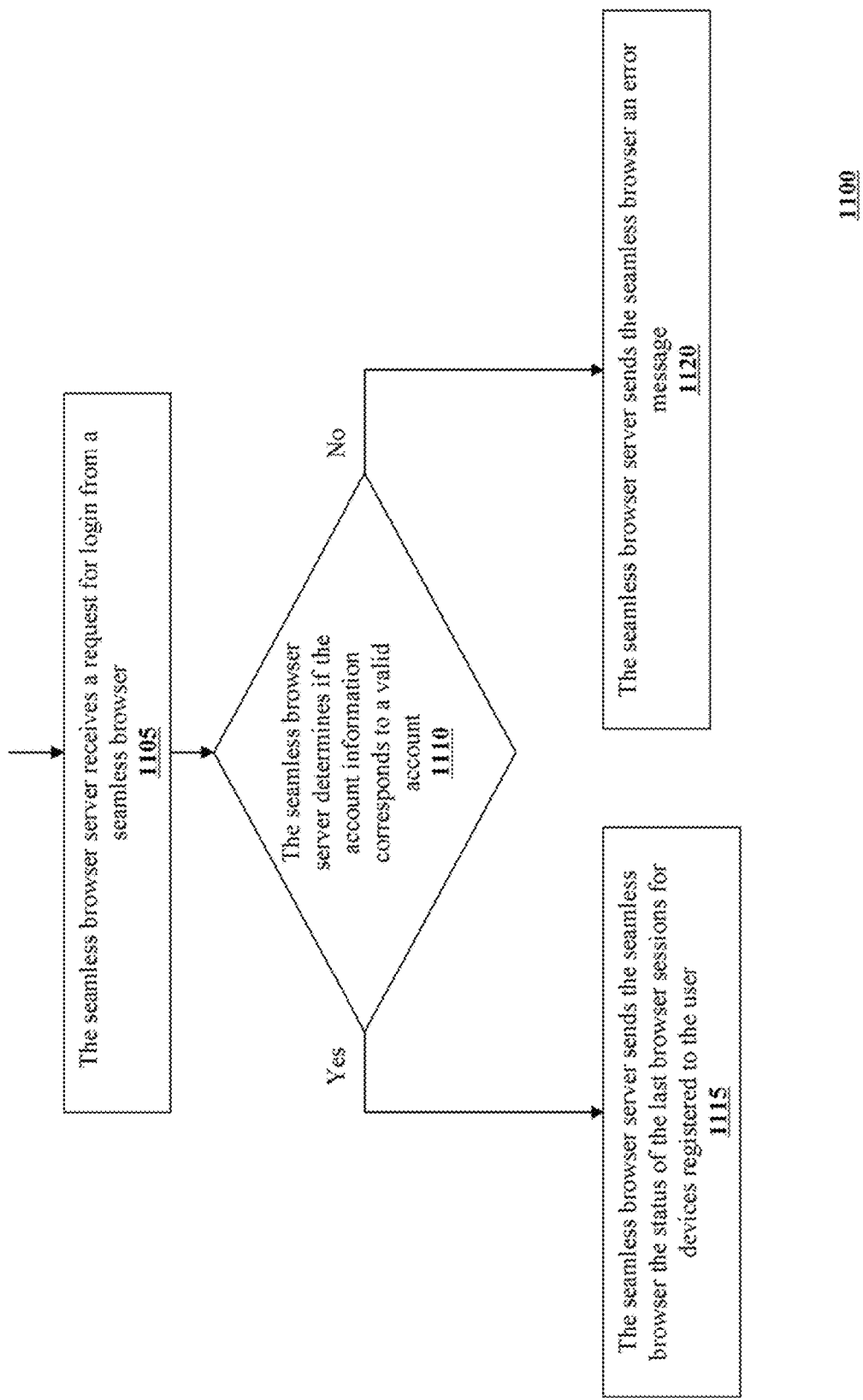
FIG. 11 depicts a flow chart for a method for a user to login to a seamless browser server according to an embodiment of the present teaching.

FIG. 11 depicts a flow chart for a method 1100 for a seamless browser server 505 to login a user according to an embodiment of the present teaching. The method 1100 begins at step 1105. At step 1105, the seamless browser server receives a request for login from a seamless browser 100. The login information may include a user ID and password, or any other means to identify the user, such as biometric information etc.

At step 1110, the seamless browser server 505 determines if the account information corresponds to a valid account. If the account information corresponds to a valid account the method proceeds to step 1115. If the account information does not correspond to a valid account the method proceeds to step 1120.

At step 1115, the seamless browser server 505 sends the seamless browser 100 the status of the last browser sessions for devices registered to the user. The seamless browser server 505 also allows the seamless browser 100 to send activity updates to the seamless browser server 505 for storage, and allows the seamless browser 100 to make requests for the status of other browsers on other devices registered to the user.

At step 1120, the seamless browser server 505 sends the seamless browser 100 an error message. The error message indicates that the login information was not valid and may offer the user suggestions or help for logging into the seamless browser server 505.

FIG. 12 depicts a flow chart for a method 1200 for a user to set up a new account on a device according to an embodiment of the present teaching. The method 1200 begins at step 1205. At step 1205, the seamless browser 100 requests new account details from the user. The user may be requested to provide a suggested user ID and password, or the user may be offered a user ID and password. The user may have to use a process of validating information using an email account or other method requiring that information be sent via an alternate route. At step 1210, the seamless browser 100 sends the new account details to the seamless browser server 505. At step 1215, the seamless browser 100 receives information regarding the new account from the seamless browser server 505. The information may be information indicating that the account was successfully set up. The information may be an error message indicating that the account could not be established, along with help information for the user.

At step 1220, the seamless browser 100 determines if the new account is accepted. If the new account is accepted, the method proceeds to step 1225. If the new account is not accepted, the method repeats from step 1205.

At step 1225, the seamless browser 100 opens a homepage. The home page may include instructions for using the seamless browser 100, a welcome page, or any other useful information.

FIG. 13 depicts a flow chart for a method 1300 for a seamless browser server 505 to set up a new account according to an embodiment of the present teaching. The method 1300 begins at step 1305. At step 1305, the seamless browser server 505 receives a request for a new account from a seamless browser 100. The request may include a user ID chosen by the user and a password chosen by the user. The user ID and password may be verified by the user being sent an email to an email account of the user.

At step 1310, the seamless browser server determines if the account already exists. If the account already exists, the method proceeds to step 1330. If the account does not exist, the method 1300 proceeds to step 1315.

At step 1315, the seamless browser server determines if the account information is acceptable. If the account information is acceptable, the method proceeds to step 1320. If the account information is not acceptable, the method proceeds to step 1330. The account information might not be acceptable because the user ID is too short, too long or uses characters or strings of characters that are not acceptable. In addition, the account information may not be acceptable because the password is too short, too long or uses characters or strings of characters that are not acceptable.

At step 1320, the seamless browser server opens a new account and stores the account information. The seamless browser server 505 opens a new account by creating a new user persistent store 725. The user persistent store 725 may be formed in the browser state storage unit 805 and in the local browser state storage unit 920. The user persistent store 725 is accessible by the user, and in some embodiments by an administrator.

At step 1325, the seamless browser server 505 sends a message indicating that the new account is established. At step 1330, the seamless browser server 505 sends a message indicating that the new account could not be established.

Figure 14:
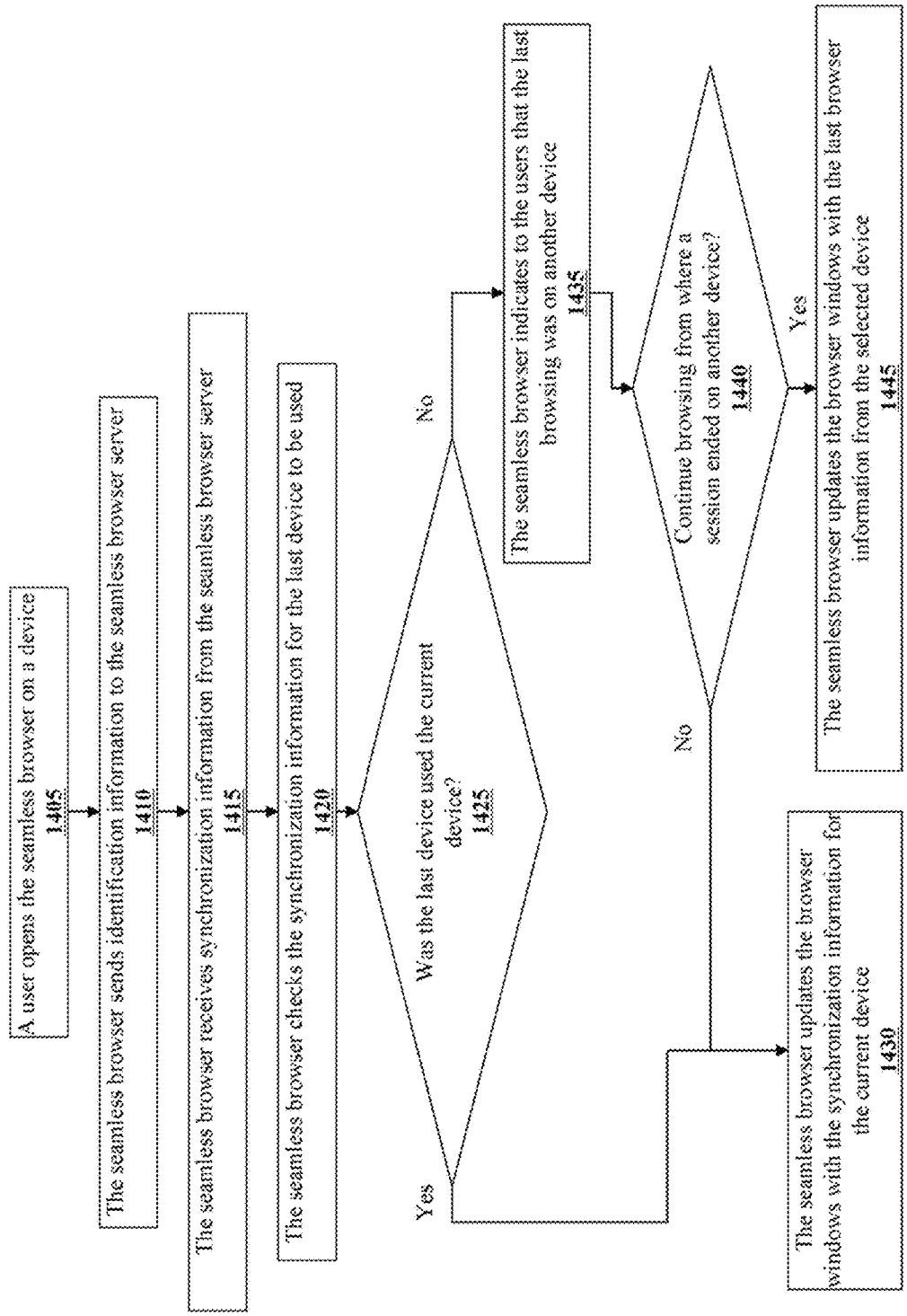
FIG. 14 depicts a flow chart for a method of a seamless browser server to deliver seamless browsing according to an embodiment of the present teaching.

FIG. 14 depicts a flow chart for a method 1400 for a seamless browser 100 to deliver seamless browsing according to an embodiment of the present teaching. The method 1400 begins at step 1405. At step 1405, a user opens the seamless browser 100 on a device. The seamless browser 100 may be opened and controlled in a similar manner to any other application on a computer, tablet, cell phone gaming machine or internet TV. For example from a menu, by pressing a button on a keyboard, remote control, by using voice commands etc.

At step 1410, the seamless browser sends identification information to the seamless browser server 505. In some embodiments, the seamless browser 100 remembers the user ID and password of the user so that the user does not need to enter the user ID or password to start the seamless browser 100. In some embodiments, the seamless browser 100 requires the user to input a user ID and/or a password before sending the identification information to the seamless browser server 505.

At step 1415, the seamless browser 100 receives synchronization information from the seamless browser server 505. The synchronization information corresponds to information in the user persistent store 725 for all of the devices of the user with a seamless browser registered to the seamless browser server 505.

At step 1420, the seamless browser 100 checks the synchronization information for the last device to be used. The seamless browser 100 checks the synchronization information for the last device to be used by, for example, reviewing the time-stamps for pages viewed in the synchronization information.

At step 1425, the seamless browser 100 checks if the last device used was the current device. If the last device used was the current device, the method proceeds to step 1430. If the last device used was not the current device, the method proceeds to step 1435.

At step 1430, the seamless browser 100 updates the rendering unit 905, the page store 925, the history store 930, and the cookie store 935 with the synchronization information for the current device. At step 1435, the seamless browser 100 indicates to the user that the last browsing was on another device. At step 1440, the seamless browser 100 asks the user if the user would like to continue browsing from where a browsing session ended on a different device. If the user wants to continue browsing from where a browsing session ended on a different device, the method proceeds to step 1445. If the user does not want to continue browsing from where a browsing session ended on another device, the method proceeds to step 1430. At step 1445, the seamless browser updates the rendering unit 905, the page store 925, the history store 930, and the cookie store 935 with the browser information from the selected device.

Figure 15:
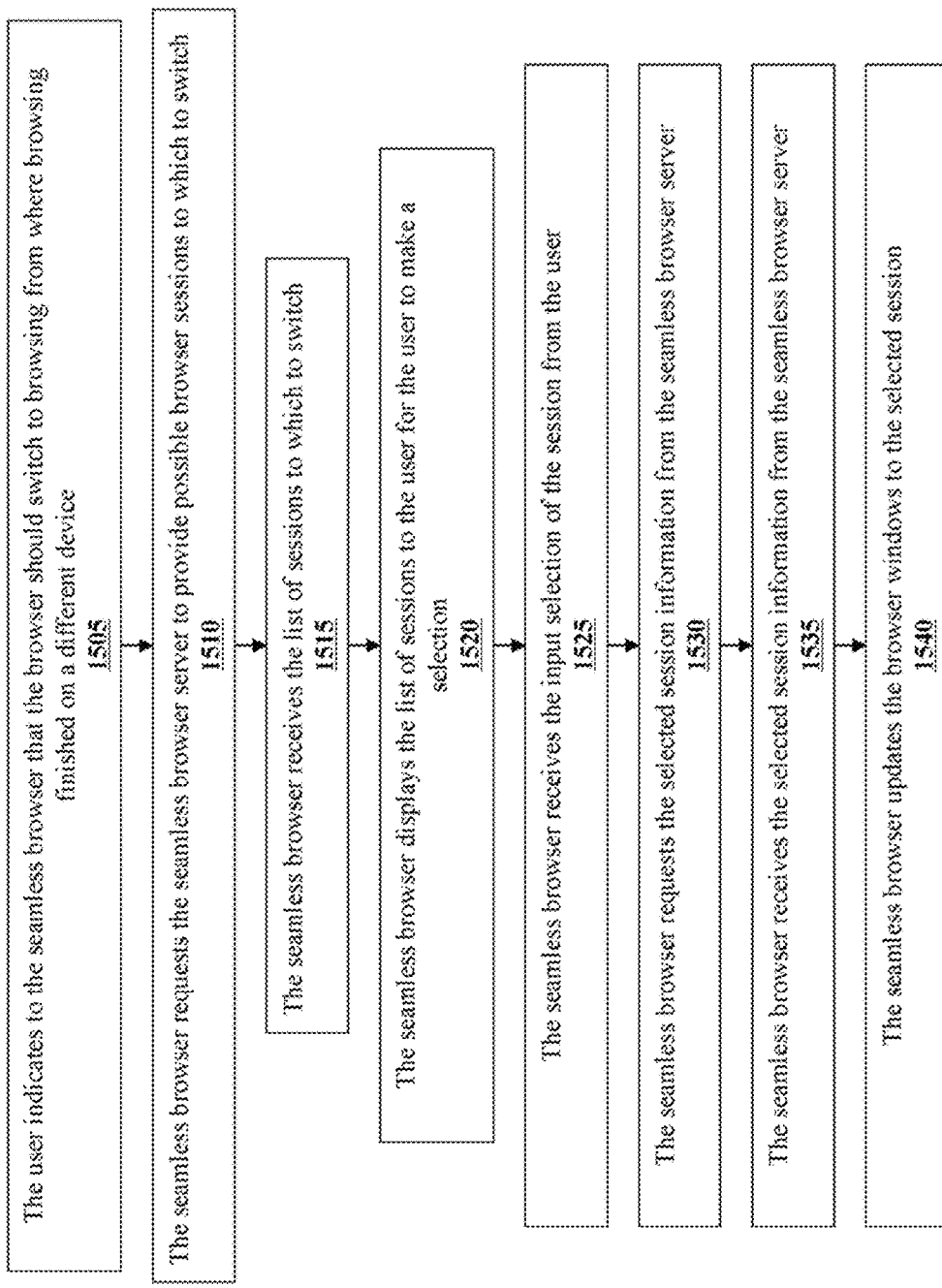
FIG. 15 depicts a flow chart for a method for changing the browser to browse from the last browsing session on a different device according to an embodiment of the present teaching.

FIG. 15 depicts a flow chart for a method 1500 for changing the seamless browser 100 to browse from the last browsing session on a different device according to an embodiment of the present teaching. The method 1500 begins at step 1505. At step 1505, the user indicates to the seamless browser 100 that the browser should switch to browsing from where browsing finished on a different device.

At step 1510, the seamless browser 100 requests the seamless browser server 505 to provide possible browser sessions to which to switch. At step 1515, the seamless browser receives the list of sessions to which to switch. At step 1520, the seamless browser 100 displays the list of sessions to the user for the user to make a selection. At step 1525, the seamless browser receives the input selection of the session from the user. At step 1530, the seamless browser 100 requests the selected session information from the seamless browser server 505. At step 1535, the seamless browser 100 receives the selected session information from the seamless browser server 505. At step 1540, the seamless browser updates the rendering unit 905, the page store 925, the history store 930, and the cookie store 935, to the selected session.

Figure 16:
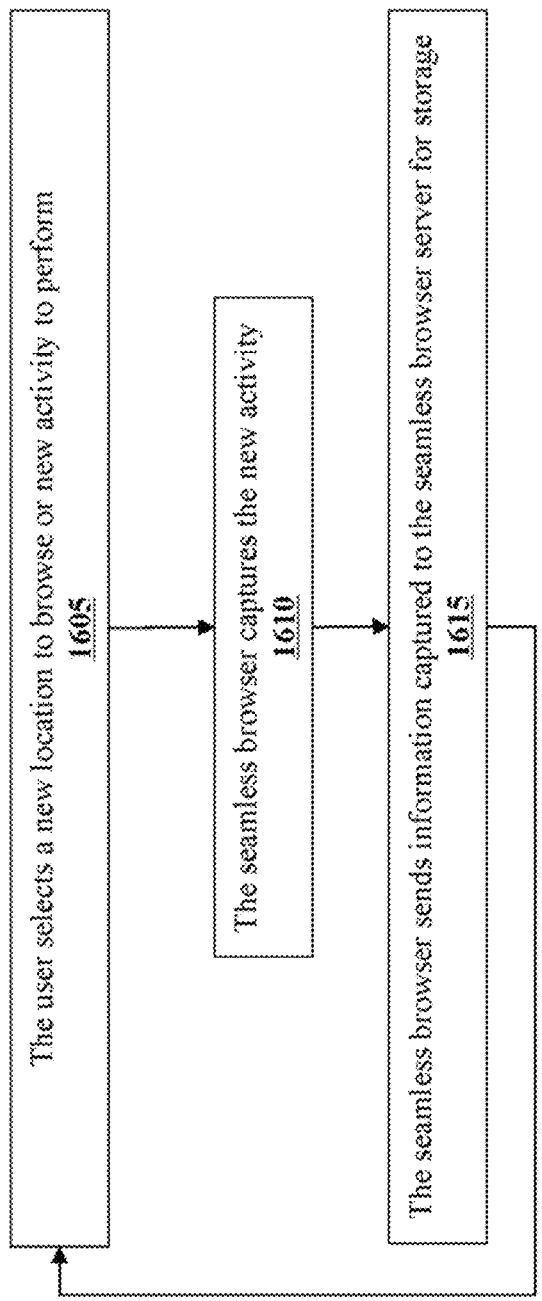
FIG. 16 depicts a flow chart for a method of storing the browsing state according to an embodiment of the present teaching.

FIG. 16 depicts a flow chart for a method 1600 of storing the browsing state according to an embodiment of the present teaching. The method for storing the browser state is continuously being performed as the user uses the seamless browser 100 on any device. If the seamless browser server 505 is not available, the seamless browser continues to store the browser state locally in the local browser state storage unit until the seamless browser server 505 is available again. When the seamless browser server 505 is available, again the information stored in the local browser state storage unit is transferred to the seamless browser server 505. The method 1600 begins at step 1605. At step 1605, the user selects a new location to browse or new activity to perform. The new activity may be for example a search, streaming audio or video files, or any other activity performed by a web browser. At step 1610, the seamless browser 100 captures the new activity. At step 1615, the seamless browser sends information captured to the seamless browser server 505 for storage. When the captured information has been sent, the method repeats from step 1605.

Figure 17:
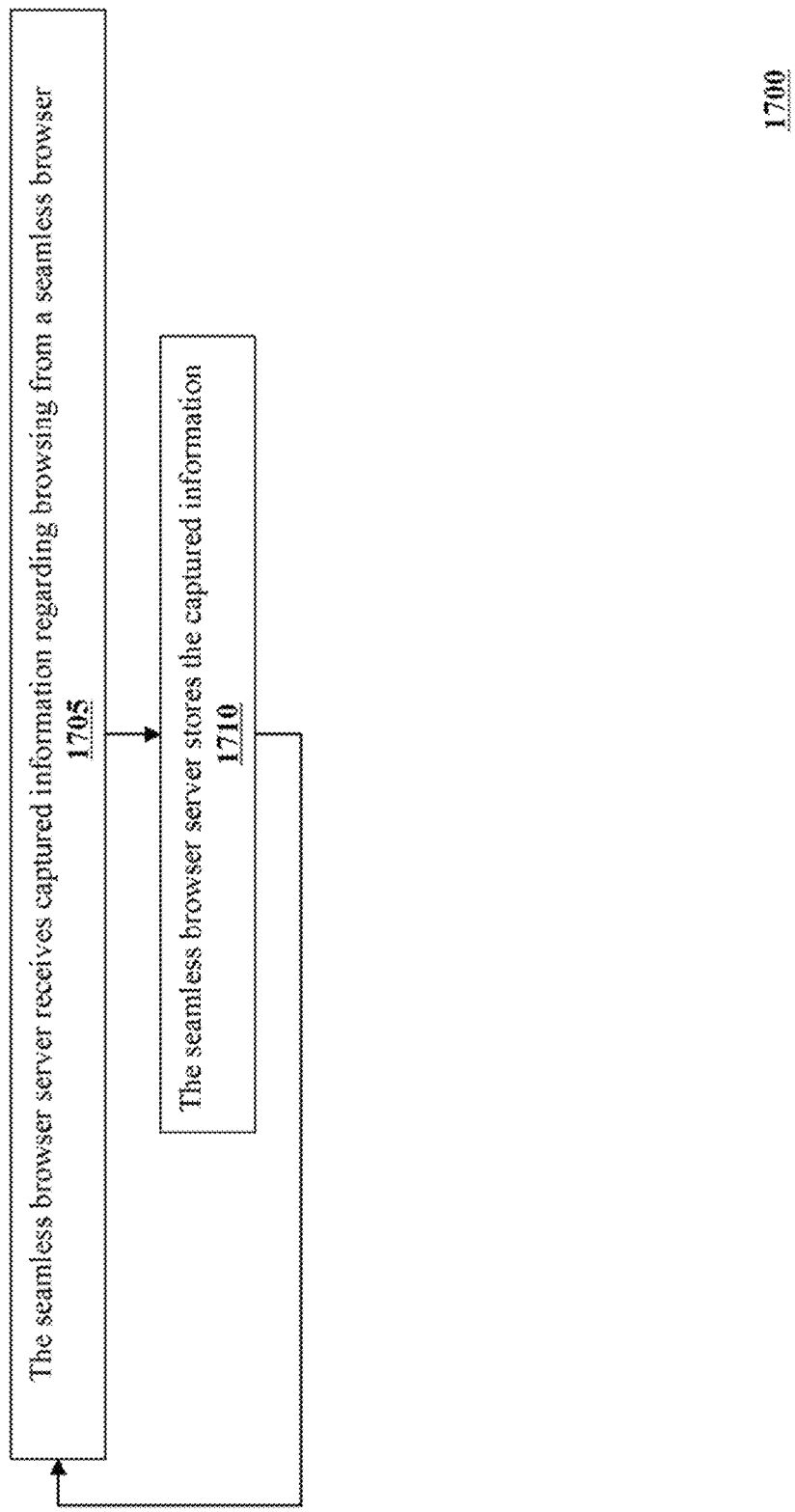
FIG. 17 depicts a flow chart for a method of storing the browsing state according to an embodiment of the present teaching.

FIG. 17 depicts a flow chart for a method 1700 a seamless browser server to store a browsing state according to an embodiment of the present teaching. The method 1700 begins at step 1705. At step 1705, the seamless browser server 505 receives captured information regarding browsing from a seamless browser 100. At step 1710, the seamless browser server 505 stores the captured information. In some embodiments, the seamless browser server 505 stores the information in the persistent store under the name of the user of the browser. In some embodiments, the seamless browser 505 stores the information in the persistent store under the name of the device the user is using. When the captured information has been stored, the method 1700 repeats from step 1705.

FIG. 18 depicts a general computer architecture 1800 on which embodiments of the disclosure can be implemented according to an embodiment of the present teaching. The general computer architecture 1800 comprises COM ports 1805, a central processing unit 1810, an internal communication bus 1815, a disk 1820, a read only memory 1825, a random access memory 1830, an I/O component 1835, and a user interface 1840.

The general computer architecture 1800 may be a general-purpose computer or a special purpose computer. This computer can be used to implement any components of the system 500, the system 600, seamless browser 900, and seamless browser server 800. For example, the browser state storage unit 805, the browser state receiving unit 810, the browser state delivery unit 815, the device-determining unit 820, user-determining unit 825, rendering unit 905, user interface unit 910, page store 925, history store 930, and the cookie store 925, can all be implemented on a computer such as the computer 1800, via its hardware, software program, firmware, or a combination thereof. Although only one such computer is shown, for convenience, the computer functions relating to seamless browsing may be implemented in a distributed fashion on a number of similar platforms, to distribute the processing load.

The COM ports 1805 connect the general computer architecture 1800 to and from a network connected thereto to facilitate data communications. The central processing unit 1810 may be in the form of one or more processors, for executing program instructions. The various data files to be processed and/or communicated by the computer as well as possibly program instructions to be executed by the central processing unit 1810 may be stored on the disk 1820 the read only memory 1825 or the random access memory 1830.

The I/O component 1835 supports input/output flows between the computer and other components therein such as user interface elements 1840. The computer 1800 may also receive programming and data via network communications.

Hence, aspects of the methods of seamless browsing, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the seamless browser 100 or seamless browser server into the hardware platform(s) of a computing environment or other system implementing a computing environment or similar functionalities in connection with seamless browsing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium, or physical transmission medium. Non-volatile storage media include, for example, optical or magnetic disks, such as any of the storage devices in any computer(s) or the like, which may be used to implement the system 700 or any of its components as shown in the drawings. Volatile storage media include dynamic memory, such as a main memory of such a computer platform. Tangible transmission media include coaxial cables, copper wire, and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media, therefore, include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, systems and their components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

We claim:

1. A method implemented on a machine having at least one processor, storage, and a communication platform connected to a network for seamless browsing comprising:
   receiving, by the at least one processor, from a first of a plurality of devices, first application state information related to a session associated with execution of a first application on the first device;
   storing, by the at least one processor, the first application state information for the first device;
   receiving, by the at least one processor, from a requesting device of the plurality of devices, a request for executing the first application;

determining, by the at least one processor, whether the first application was executed last on the requesting device based on an attribute associated with the first application;

responsive to a determination that the first application was not executed last on the requesting device:

transmitting, by the at least one processor, to the requesting device, a list of a plurality of sessions, each session being associated with execution of the first application on a corresponding one of the plurality of devices and indicating a name and type of the corresponding one of the plurality of devices, wherein a user selects from the list presented on the requesting device any of the plurality of sessions;

receiving, by the at least one processor, from the requesting device, a user selection of a session from the list of the plurality of sessions based on the name and the type of the device associated with the selected session; and responsive to the received user selection, transmitting, by the at least one processor, to the requesting device, application state information related to the selected session such that the first application is seamlessly continued on the requesting device; and responsive to a determination that the first application was executed last on the requesting device, transmitting, by the at least one processor, to the requesting device, the first application state information.

2. The method according to claim 1, wherein the first application includes a web browser, and the first application state information or the application state information related to the selected session includes one or more recently accessed web pages or one or more recent search queries.

3. The method according to claim 1, wherein the first application state information includes information regarding an identification of the user associated with the first application.

4. The method according to claim 1, wherein the first application state information includes information regarding a device type of the first device.

5. A system for seamless user interaction, comprising:
at least one processor programmed to execute one or more computer program instructions which, when executed, cause the at least one processor to:
receive from a first of a plurality of devices, first application state information related to a session associated with execution of a first application on the first device;
store the first application state information for the first device;
receive from a requesting device of the plurality of devices a request for executing the first application;
determine whether the first application was executed last on the requesting device based on an attribute associated with the first application;
responsive to a determination that the first application was not executed last on the requesting device:
transmit, to the requesting device, a list of a plurality of sessions, each session being associated with execution of the first application on a corresponding one of the plurality of devices and indicating a name and type of the corresponding one of the plurality of devices, wherein a user selects from the list presented on the requesting device any of the plurality of sessions;
receive, from the requesting device, a user selection of a session from the list of the plurality of sessions based on the name and the type of the device associated with the selected session; and
responsive to the received user selection, transmit, to the requesting device, application state information related to the selected session such that the first application is seamlessly continued on the requesting device; and
responsive to a determination that the first application was executed last on the requesting device, transmit, to the requesting device, the first application state information, if the first application was executed last on the requesting device, and information related to the selected session, if the first application was not executed last on the requesting device, such that the first application is seamlessly continued on the requesting device.

6. The system of claim 5, wherein the first application includes a web browser, and the first application state information or the application state information related to the selected session includes one or more recently accessed web pages or one or more recent search queries.

7. A method implemented on a requesting device having at least one processor, storage, and a communication platform, comprising:
executing, by the at least one processor, a first application in association with a first session, wherein each session associated with the first application is indicative of an execution status of the first application;
receiving, by the at least one processor, a user request requesting execution of the first application;
responsive to the user request, transmitting, by the at least one processor, a request for a plurality of candidate sessions associated with execution of the first application on a plurality of devices to a server configured to store information related to the plurality of candidate sessions;
responsive to a determination that the first application was not executed last on the requesting device, receiving, by the at least one processor, a list of the plurality of candidate sessions, each session being associated with execution of the first application on a corresponding one of the plurality of devices and indicating a name and type of the corresponding one of the plurality of devices, such that a user selects any of the plurality of candidate sessions from the list presented to the user;
responsive to the determination, receiving, by the at least one processor, a user selection of a session from the list of the plurality of sessions based on the name and the type of the device associated with the selected session;
transmitting, by the at least one processor, the user selection to the server;
responsive to the transmission of the user selection, receiving, by the at least one processor, application state information related to the selected session from the server;
responsive to a determination that the first application was executed last on the requesting device, receiving, by the at least one processor, application state information related to the first session; and
executing, by the at least one processor, the first application in association with the selected session or in association with the first session based on the received application state information such that the first application is seamlessly continued.

8. The method of claim 7, wherein the first application includes a web browser, and
wherein the application state information related to the first session or the application state information related to the selected session includes one or more recently accessed web pages or one or more recent search queries.

9. The method of claim 7, wherein the plurality of devices is associated with an account of the user.

10. The method of claim 7, wherein the application state information related to the execution of the first application on the requesting device includes information regarding an identification of the user associated with the first application.

11. The method of claim 7, wherein the application state information related to the execution of the first application on the requesting device includes information regarding a device type of the requesting device.

12. The method according to claim 1, wherein the first application state information includes a history and cookies that pertain to the execution of the first application.

13. The method according to claim 1, wherein the first application state information includes a device type of the first device, a timestamp associated with the execution of the first application, and a title or uniform resource locator (URL) of a last viewed page at the first device.

14. The method according to claim 1, further comprising:
establishing a connection with the first device,
wherein the first application state information is stored locally at the first device, until the connection is established.

15. The method according to claim 1, wherein the plurality of sessions includes at least one session from each of the plurality of devices.

16. The method according to claim 1, wherein each of the plurality of sessions comprises a page browsing history of the device with which the respective session is associated.

17. The method according to claim 1, wherein each of the plurality of sessions comprises a search query history of the device with which the respective session is associated.

* * * * *